United States Patent
Arens et al.

(10) Patent No.: US 11,994,532 B2
(45) Date of Patent: May 28, 2024

(54) ULTRASONIC ANEMOMETERS SYSTEMS FOR SENSING AIR FLOWS IN ROOMS AND DUCTS

(71) Applicant: THE REGENTS OF THE UNIVERSITY OF CALIFORNIA, Oakland, CA (US)

(72) Inventors: Edward A. Arens, Berkeley, CA (US); Ali Ghahramani, Berkeley, CA (US); Therese Peffer, Berkeley, CA (US); Paul Raftery, Berkeley, CA (US); Hui Zhang, Moraga, CA (US); Michael P. Anderson, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 334 days.

(21) Appl. No.: 17/496,239

(22) Filed: Oct. 7, 2021

(65) Prior Publication Data
US 2022/0099697 A1    Mar. 31, 2022

Related U.S. Application Data

(63) Continuation of application No. PCT/US2020/027265, filed on Apr. 8, 2020.
(Continued)

(51) Int. Cl.
*G01P 5/24*        (2006.01)
*F24F 11/89*      (2018.01)
(Continued)

(52) U.S. Cl.
CPC .............. *G01P 5/245* (2013.01); *F24F 11/89* (2018.01); *G01K 11/24* (2013.01); *F24F 2110/10* (2018.01); *F24F 2110/30* (2018.01)

(58) Field of Classification Search
CPC .......... G01P 5/245; G01P 5/248; G01P 13/04; F24F 11/89; F24F 2110/10; F24F 2110/30; G01K 11/24; G01F 1/662; G01F 1/667
(Continued)

(56) References Cited

U.S. PATENT DOCUMENTS 4,890,488 A  *   1/1990   Pincent ..................... G01P 5/18
                                                                       73/170.13
5,583,301 A    12/1996   Strauss
(Continued)

FOREIGN PATENT DOCUMENTS

DE       102008026957      12/2008
WO       2010020939 A2     2/2010

OTHER PUBLICATIONS

ISA/US, United States Patent and Trademark Office (USPTO), international search report and written opinion dated Jul. 2, 2021, related PCT international application No. PCT/US2020/027265, pp. 1-14, claims searched, pp. 15-20.
(Continued)

*Primary Examiner* — Nathaniel T Woodward
(74) *Attorney, Agent, or Firm* — O'BANION & RITCHEY LLP; John P. O'Banion

(57) ABSTRACT

Systems and devices for airflow measurements in rooms and air delivery ducts with low-cost, low-power, accurate, calibration-free, and compact wireless airflow sensors are provided. The system uses room and duct flow sonic anemometers and processing to measure air velocities and temperatures as well as allow control over the environmental conditioning systems. The anemometers use arrays of transmitter/receivers to simultaneously measure multiple sound paths and determine velocity vectors and volumetric flow paths. By transmitting in both directions along the paths between transceivers, differential times of flight (TOF) are
(Continued)

measured. These determine both the velocity and temperature of the air along each path.

24 Claims, 8 Drawing Sheets

Related U.S. Application Data

(60) Provisional application No. 62/830,993, filed on Apr. 8, 2019.

(51) Int. Cl.
   *G01K 11/24* (2006.01)
   *F24F 110/10* (2018.01)
   *F24F 110/30* (2018.01)

(58) Field of Classification Search
   USPC .................................................. 73/861.31
   See application file for complete search history.

(56) References Cited

U.S. PATENT DOCUMENTS

| | | | | |
|---|---|---|---|---|
| 10,101,443 | B1* | 10/2018 | LeGrand, III | G05D 3/00 |
| 2008/0294356 | A1* | 11/2008 | Poulos | G01P 13/02 |
| | | | | 702/45 |
| 2015/0019022 | A1 | 1/2015 | Karamanos | |
| 2015/0027220 | A1 | 1/2015 | Halfon | |
| 2016/0273879 | A1 | 9/2016 | Volfson | |
| 2017/0299718 | A1 | 10/2017 | Kydar | |
| 2018/0313865 | A1 | 11/2018 | Osborn | |
| 2019/0128713 | A1* | 5/2019 | Campbell | G01S 7/521 |

OTHER PUBLICATIONS

Chandran, Pooja et al., "FPGA Based ToF Measurement System for Ultrasonic Anemometer", IEEE 2017 2nd International Conference on Communication and Electronics Systems (ICCES), 2017, pp. 30-34, doi: 10.1109/CESYS.2017.8321297.

Arens, Edward et al., "Thermal and Air Quality Acceptability in Buildings that Reduce Energy by Reducing Minimum Airflow from Overhead Diffusers", Final Report, Ashrae RP-1515, Nov. 2012, pp. 1-284, published Nov. 1, 2012, downloaded from https://escholarship.org/uc/item/3jn5m7kg.

Hoyt, Tyler et al., "Extending Air Temperature Setpoints: Simulated Energy Savings and Design Considerations for New and Retrofit Buildings", Building and Environment, Sep. 2014, pp. 1-20, published Sep. 1, 2021, doi:10.1016/j.buildenv.2014.09.010, downloaded from https://escholarship.org/uc/item/13s1q2xc.

* cited by examiner ized sensors.
ULTRASONIC ANEMOMETERS SYSTEMS FOR SENSING AIR FLOWS IN ROOMS AND DUCTS

CROSS-REFERENCE TO RELATED APPLICATIONS

This application claims priority to, and is a 35 U.S.C. § 111(a) continuation of, PCT international application number PCT/US2020/027265 filed on Apr. 8, 2020, incorporated herein by reference in its entirety, which claims priority to, and the benefit of, U.S. provisional patent application Ser. No. 62/830,993 filed on Apr. 8, 2019, incorporated herein by reference in its entirety. Priority is claimed to each of the foregoing applications.

The above-referenced PCT international application was published as PCT International Publication No. WO 2020/210355 A1 on Oct. 15, 2020, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This technology pertains generally to airflow and airspeed measurement devices and systems, and more particularly to room and duct sonic anemometers and airflow measurement systems. The devices use arrays of transmitter/receiver elements, such as MEMS ultrasonic range-finding sensors, to simultaneously measure multiple sound paths to determine velocity vectors and volumetric flow paths.

2. Background

Thermal comfort levels of occupants within indoor environments are greatly influenced by the air speed and direction of conditioned air. Environmental air quality is also influenced by air movement and room ventilation exhausting harmful particulates and limiting exposure to hazards like smoke or airborne pathogens.

Of the four variables that affect conditions in an indoor environment (air and radiant temperature, humidity, and air movement), air movement is the only variable that cannot be easily monitored at the present time. The Heating Ventilation and Air Conditioning (HVAC) systems in most office and commercial buildings do not operate optimally and waste energy and up to 60% of the waste involves the lack of air flow management. The operation of the thermal control systems and fan power rely heavily on knowing or predicting the state of air movement.

Although environmental control is particularly important in high performance buildings such as data centers, hospitals and laboratories, room airflow is almost never monitored because of the expense, power draw, directional sensitivity, and fragility of existing sensors.

Air flow monitoring in ducts, and in other HVAC equipment such as air handling units, outside air measurement stations variable air volume boxes, and diffusers, is currently obtained by damper position inferences, pressure sensors, or hotwire sensors, each of which may go out of calibration due to fouling, drift, and incorrect commissioning. Furthermore, airflow in ducts is hard to measure accurately because it is never uniform across the duct cross-section and the measurement is affected by surrounding conditions, such as elbows, fans, and boxes, which introduce turbulence and flow distortions that limit accuracy.

Pressure-drop-based sensing using damper and orifice constrictions also requires additional central fan power to drive air through the constriction and loses accuracy at low flows, which is important for maintaining minimum ventilation requirements. Fume hoods, room air flow balancing, and exhaust duct monitoring are also expensive and may have low precision at low airflow rates.

The result is that building control systems often cannot predict energy flows accurately resulting in energy losses in the system. Poor airflow prediction also causes designers and operators to use large safety factors in their minimum flow set points, causing widespread over-ventilation and over-cooling at great energy cost, or under-ventilation that can cause indoor air quality issues.

Present approaches to measuring airspeed and air velocity include: (1) hot-wire and hot-film heated elements that measure the changes in current or voltage from airflow cooling, (2) impellers such as propellers or rotating cups, (3) eddy-shedding shapes where the frequency of cooling rate on the backside is sensed, and (4) devices that measure the difference between dynamic (velocity) pressure and static pressure, such as pitot tubes.

Most of these devices are limited by their directionality, requiring a rotating or gimbal support if they are to measure airflows in all directions. They also are limited in their accuracy. Readings may also drift as sensors become dirty or corrode. Because some devices require sensitive moving parts or lightweight heating elements, they are not durable and are prone to breaking. In addition, heated sensors may require substantial electrical energy to operate requiring a power supply for long-term operation. Accordingly, there is a need for improved sensors and sensor systems for accurate air speed and air flow measurements for environmental control systems.

Direct flow measurement of air flow in ducts, fume hoods, and occupied space would enable more responsive system control, and more immediate safety alarms in the event that airflows become reversed. There is also need for inexpensive measurement devices, inexpensive communication capability, and inexpensive techniques for installing them in existing structures as well as in new buildings. The devices should also be reliable and insensitive to mistakes or unintended changes to their physical orientation.

BRIEF SUMMARY

A system of low-cost, low-power, accurate, calibration-free, and compact wireless airflow sensors and methods are provided. The system is illustrated with two closely related sonic devices: (a) "Room Anemometer" (RA) for measuring 3D air velocity vectors and air speed for measuring air flow and flow direction in rooms; and (b) "Duct Flow Anemometer" (DA) measuring volumetric air flow and temperature distribution within an HVAC duct, both devices detecting differential times of flight between pairs of sensors. Both have groups of transceivers serving to transmit and receive ultrasonic soundwaves. By transmitting in both directions along the paths between transceivers, differential times of flight (TOF) are measured. These determine both the velocity and temperature of the air along each path. In the devices described below, multiple signal paths are measured simultaneously by receivers for each transmitted signal. They could also operate with pairwise communication, but much less efficiently.

These illustrated devices, though different in shape, have topologically similar arrangements of transceivers. In one RA embodiment, the arrangement measures a 3-dimensional vector of wind speed and direction within the small volume of the tetrahedron. The tetrahedron uses the smallest number of transceivers possible for 3D flow measurement, while achieving redundant flow paths that enable precise elimination of wind disturbance effects caused by the anemometer's support structure/enclosure (described below). (Other polygons other than tetrahedra might be used as well, particularly bipyramidal arrangements of n-base polygon where n is 3 or above.)

In both of the general DA embodiments the transceivers measure averaged values of a one-directional flow within a (typically much larger) duct cross section that may be experiencing different velocities and temperatures at different points across the duct cross-section. The two DA schemes have different redundancy properties that can be exploited for different applications.

In one preferred embodiment, the room anemometer embodiment uses four sensors as the minimal number of transceivers for three-dimensional (3D) flow definition and reducing the number of obstacles along the path between transceivers. The shape produced by four sensors spaced equally is called a tetrahedron. The "one-pitch, three-catch" arrangement means that each transceiver emits a signal in turn and the other three receive it. In addition, a cone shape or omnidirectional "horn" attached to the transceiver sensor boosts the signal from noise in all directions.

Similarly, in the duct anemometer embodiment with bi-pyramidal orientation of sensors and sonic pathways, a one-pitch, five-catch configuration since the bi-pyramid has a four-sided base and an opposing apex transceiver in that embodiment. A pyramidal transceiver configuration would provide a one-pitch, four-catch sensing arrangement.

The ultrasonic anemometers use vibrating membranes to transmit and receive sonic waves traveling upwind and downwind; the air speed measurement relies on the differences induced by air flows on the time required for sound to travel from one sensor to another. Airspeed is measured in in two ways: 1) a time-difference approach tracks and compares the membrane vibration deflection (magnitude) peaks from arriving sound wave bursts, and 2) a phase-difference approach using measurements of phase angle differences within wave cycles of membrane vibration caused by sound waves, arriving either in bursts or continuously. Phase-difference ultrasonic anemometers yield more accurate measurements than time-difference ultrasonic anemometers because phase angles are more sensitive to smaller changes in the time of flight caused by wind or temperature differences.

In one embodiment the devices are based on arrays of microelectromechanical (MEMS) sensor chips, allowing lower cost, higher accuracy, faster response, and lower power requirements than comparable air flow sensing technologies.

In another embodiment the devices may contain radios for wireless data output. Advanced signal processing algorithms allow flow and temperature analysis in both homogeneous and inhomogeneous flow fields. In one embodiment, onboard compass and accelerometers continuously correct for changes in the Room Anemometer's orientation.

The anemometers can be inexpensively installed in existing buildings, operate on a battery for years, and communicate wirelessly to the internet. Through the internet, their measurements can be integrated into the building's HVAC control system. The anemometers also sense air temperature, compass orientation, and tilt. The digital MEMS transceiver elements and the integrated wireless communication platform enables the device to operate untethered on battery power for many years. The low cost of the system enables precise anemometry to be widely implemented in buildings and in building components, enabling a new level of accuracy in building control and accompanying energy savings.

The system may also use specifically designed and tailored algorithms for processing transceivers signals to extract time-of-flights for ultrasonic waves. Algorithms for correction of wake effects caused by the RA enclosure are uniquely enabled by the sensor configuration, the single-transmit/multiple-receive operation of the device, and the redundant sensor paths mentioned above. This allows wake effects to be bypassed by dropping wake-affected paths and using only unaffected paths.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, systems and methods for measuring airflow and airflow direction that are low-cost, low-power, accurate, calibration-free, and compact and preferably wireless are generally shown. Several embodiments of the technology are described generally in FIG. 1 to FIG. 13 to illustrate the characteristics and functionality of the devices, systems and methods. The systems are illustrated with two closely related sonic sensing devices: (a) "Room Anemometer" for measuring 3D air velocity vectors and air speed for measuring air flow and flow direction in rooms; and (b) "Duct Flow Anemometer" measuring volumetric air flow and temperature distribution within an HVAC duct, both devices detecting differential times of flight between pairs of sensors. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
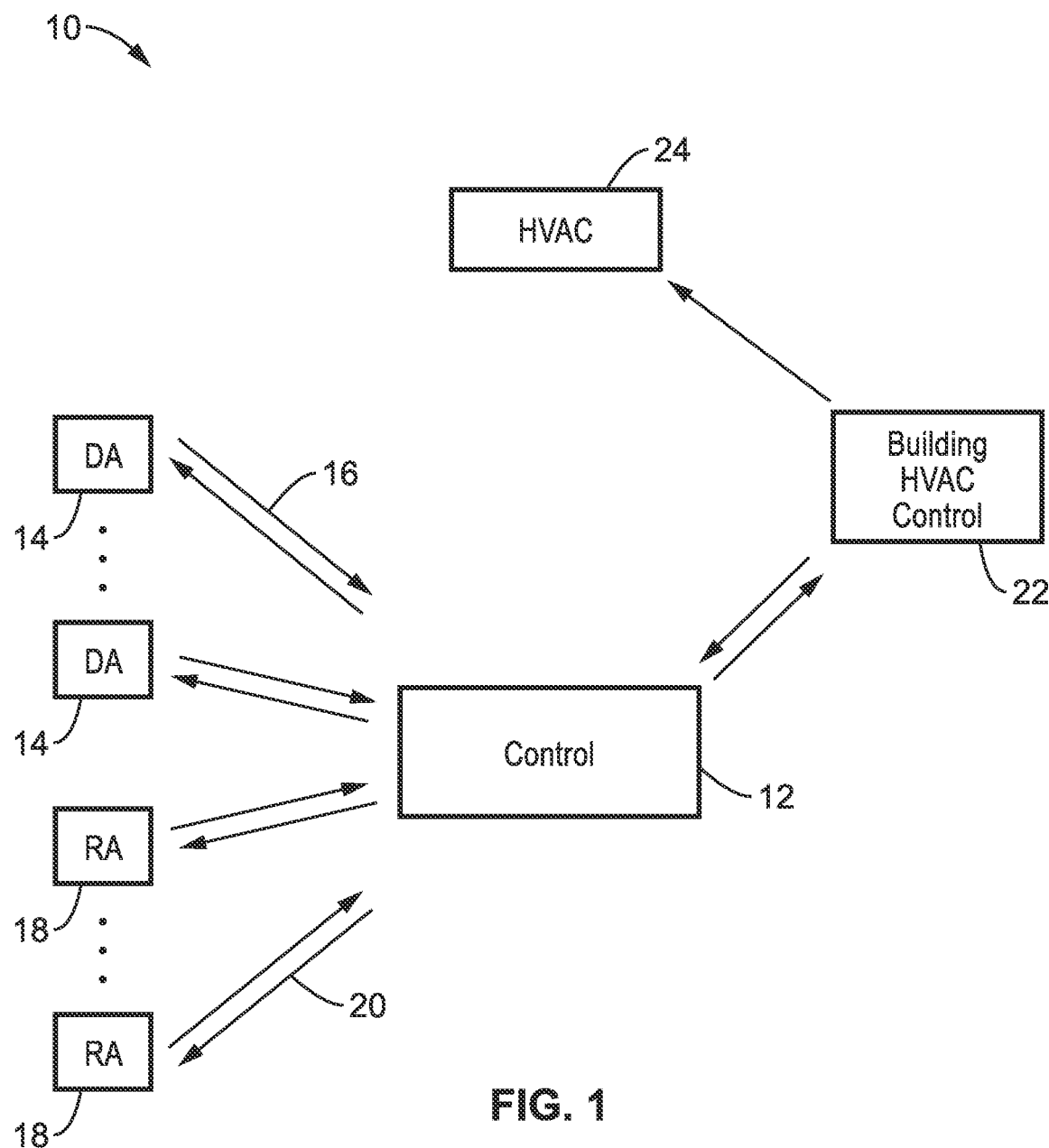
FIG. 1 is a schematic system diagram of a building environmental control system with control processing and Room Anemometers (RA) and Duct Flow Anemometers (DA) for air flow sensing and temperature measurements according to one embodiment of the technology.

Turning now to FIG. 1, one embodiment of a system for airflow measurements and environmental control is shown schematically and is used to illustrate the technology. The typical system 10 has at least one central control 12 with computer processing and software capabilities, data storage, wired or wireless transmitting/receiving functions and display. In the embodiment shown in FIG. 1, the control 12 is wirelessly connected to one or more duct flow anemometers 14 that are configured to send and receive data and control commands from the central control 12. Radio or similar types of wireless signals 16 are sent and received from control 12 from the duct flow anemometers 14. In one embodiment, the anemometers transmit and receive to a router and to the central control 12 via the Internet. In another embodiment, the duct flow anemometers 14 are directly wired to the central control 12.

The duct flow anemometers 14 quantify volumetric air flow (and optionally average temperature) in HVAC ducts, air handlers, variable air volume boxes, and fume hoods. The duct anemometer 14 preferably averages the airflows of pathways across a duct or orifice, allowing accurate measurement of volumetric flows in rectangular and circular ducts, and with minimal insertion into the airstream (useful for dirty and corrosive airstreams found in laboratory exhaust and industrial processes).

Central control 12 may also be connected to one or more room anemometers 18 for measuring air speed, air flow and flow direction in rooms. The room anemometers 18 are wirelessly connected to control 12 through radio or similar type of wireless signals 20 to transmit and receive data and control commands from control 12. In another embodiment, the duct and room anemometers 14, 18 are wired directly to the central control 12 or some combination of both wired and wireless connections. In another embodiment, the room and duct anemometers communicate wirelessly to a router and the internet to the central control 12.

The room anemometer 14 unit is used to characterize air movement at a point in space. Indoor applications include measuring human comfort and ventilation, data center cooling, controlling pollutant transport in hospitals, labs, and clean rooms, and monitoring smoke migration in fires. There are also agricultural and vehicular applications for the technology.

Central control 12 is also connected to the building environmental controller 22 that controls the HVAC heating, cooling and air delivery functions 24 in the embodiment shown in FIG. 1. In another embodiment, the control 12 control functions are connected directly to the HVAC to control the conditioning functions 24 in place of the building environmental controls 22.

The system and sensing and control functions shown in FIG. 1 can also be modular with the central control connected to a master control (not shown) for control over individual floors or sections of a building interior space. Both anemometers 14, 18 use arrangements of ultrasonic sensors that create a set of sound pathways among each pair of sensors. High frequency sonic pulses of preferably less than a one quarter millisecond are sent in both directions down each sound path, and the differences in the time-of-flight (TOF) of each signal determine the wind velocity along the path. Continuous sonic waves may also be used in another embodiment. The final algorithm tracks the difference within a single defined sound wave within the sonic pulse, and the method is guided by a temperature measurement. In one embodiment, the anemometers include a built-in temperature sensor, a built-in magnetic compass/accelerometer (tilt) sensor to permit the instrument to self-orient, and a built-in radio for wireless communication with central control 12 or alternatively to a router/internet to control 12.

Figure 2:
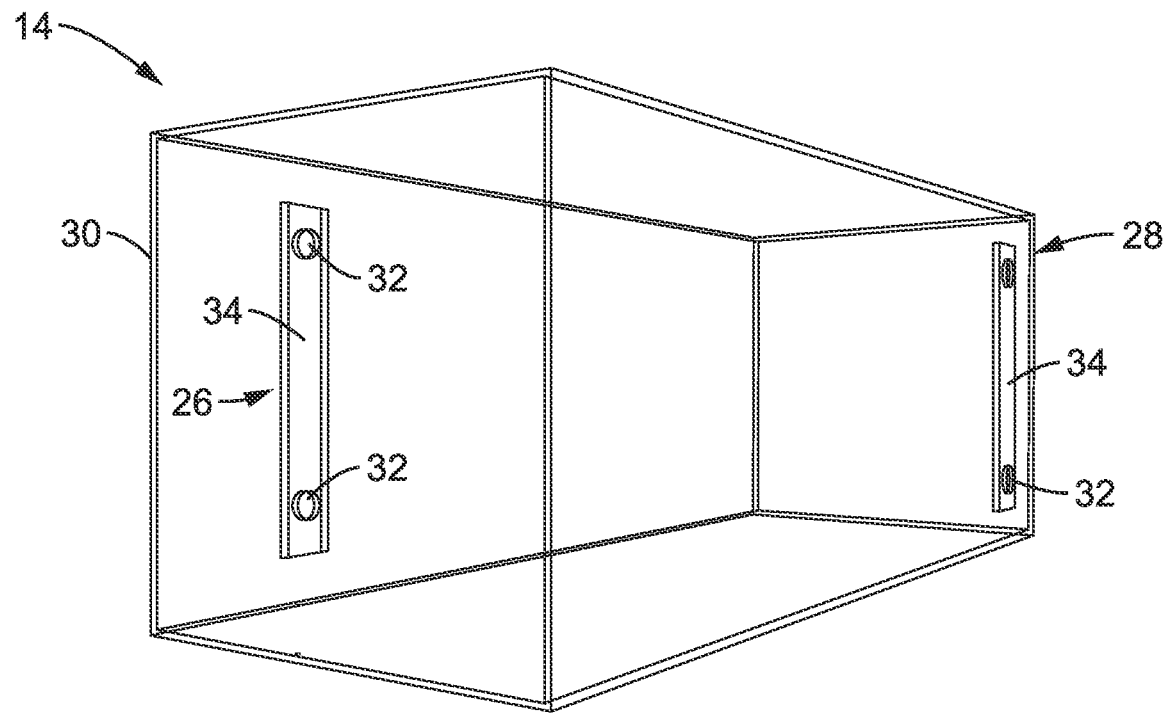
FIG. 2 is a schematic perspective side view of duct flow anemometers installed in a square duct according to one embodiment of the technology.

The general purpose of the duct anemometer 14 is to measure integrated air speed and volumetric flow in HVAC systems, and also significant details about the distribution of air speed and temperature over the duct cross-section. One simple embodiment of the duct anemometer 14 detector is illustrated in FIG. 2 and configured to measure the average air flow and temperature in a two-dimensional cross-section through a square duct 30. The anemometer device 14 has a first sonic sensing element 26 mounted to one side of duct 30 and a second corresponding sonic sensing element 28 mounted to the opposite side of the duct 30.

The sensing elements 26, 28 preferably have at least one transmitter/receiver and a structure to fix and position the sensing elements at defined positions within the interior of the duct 30. Two transceivers 32 are mounted to a bracket 34 in the sensing elements of the anemometers illustrated in FIG. 2 and FIG. 3 not drawn to scale. The bracket 34 of each element can be positioned at designated points in the interior of the duct 30 so that the transceivers 32 are facing each other across the duct 30. Although two transceivers 32 are mounted to each bracket 34, three or more sonic transceivers 32 can be mounted to each bracket 34 and oriented within the duct 30. Although transceivers are preferred, it will be understood that separate sound transmitters and sound receivers may also be used and considered to be functionally equivalent to transceivers.

Figure 3:
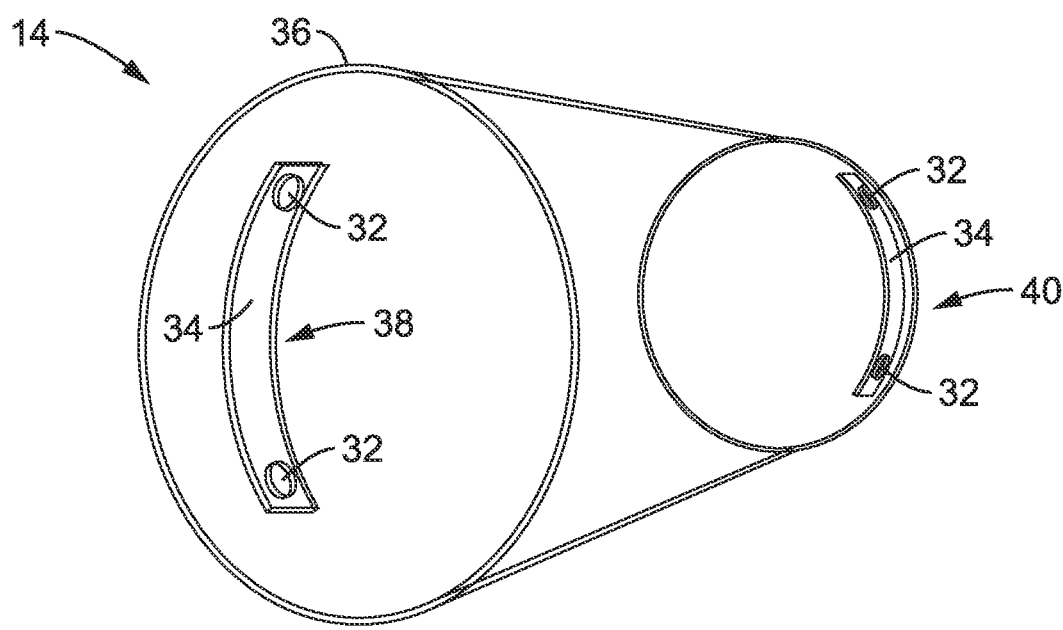
FIG. 3 is a schematic perspective side view of duct flow anemometers installed in a circular duct according to one embodiment of the technology.

In another configuration, a set of either two or three transceivers 32 spaced along a bracket 34 facing each other across the inside of the duct, one relatively upwind of the other as shown in FIG. 3.

The duct anemometer shown in FIG. 2 depicts the transceivers mounted on the surface or flush with the bracket 34. Alternatively, in one embodiment, the transceivers 32 are coupled to stubs that extend into the interior of the duct that are in turn mounted to bracket 34. The duct anemometer 14 could also use brackets 34 with transceivers mounted inside of the duct 30, 36 sidewalls or the bracket 34 could be mounted on the outside of the duct with the transceivers 32 are oriented through the sidewalls of the duct mounted on an extension stub. The length of the stub assures that the transceiver is positioned beyond the duct boundary layer, and clear of acoustic signals reflected by the sidewalls of the duct.

In the embodiment shown in FIG. 2 and FIG. 3, sensors are arrayed in two vertical lines on both sides of the duct, producing a cross-duct diagonal sheet of sonic paths with an upstream-downstream separation distance between the two sensor element arrays 38, 40 (4 sensors (2×2) give 4 paths). The cross-duct sonic paths may be averaged across the duct cross-section. The configuration measures velocities and temperatures on all horizontal and diagonal cross-duct paths.

Figure 4:
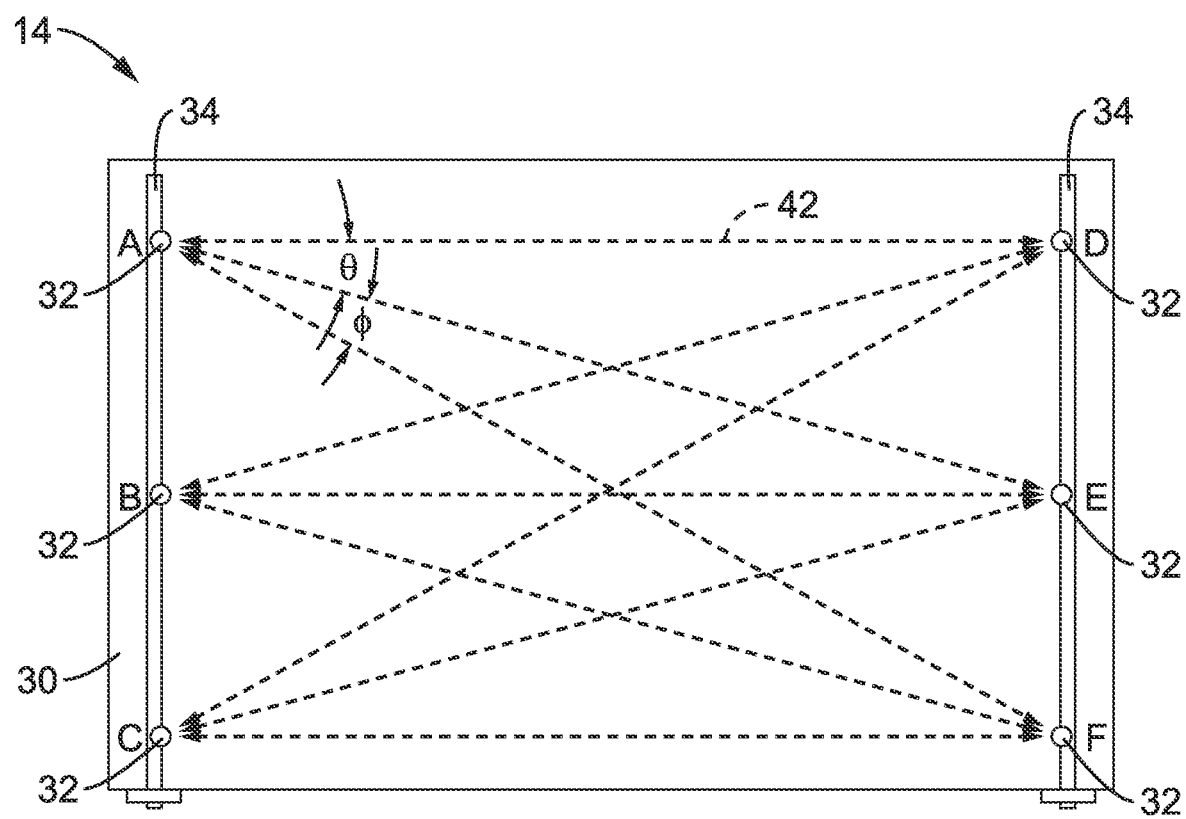
FIG. 4 is a cross-section of a duct with opposing three-transceiver brackets mounted in the duct showing the emitted sonic pathways. Six transducers produce nine signal paths across duct cross-section, revealing vertical differences in non-uniform flows. Averaging all path velocities provides total duct flow and temperature.

Referring also to FIG. 4, six transducers produce nine signal paths across a duct cross-section, revealing vertical differences in non-uniform flows. Averaging all path velocities provides total duct flow. Measurement of duct flow temperatures can take place the same way. In this embodiment, the sonic elements have three transducers 32 each that are positioned on two sides of a rectangular duct 30, preferably with one element upstream of the other. Each element has a bracket 34 with three transducers 32 each oriented to be facing the opposing element. A sound pulse from one side can be transmitted to the three opposite transceivers 32 situated on the other side of the duct. All six transceivers 32 (on both sides) may also transmit in turn. There are therefore nine paths 42 with time-of-flight differences of a sound pulse between the three transceivers on one side and the three on the other. The average differences in time will indicate the average speed passing within the duct. Non-uniformity in the duct flow (i.e. differences in time of flight between the top transceivers and bottom transceivers) will also be detectable. For the horizontal paths 42 at top and bottom of the duct, with the transceivers directly "facing" each other, the signal strength will be stronger and less noisy than in the diagonal paths. Ideally each sensor 32 would ignore vertical velocities (e.g., airflow moving perpendicular to the nominal air flow in the duct) and would focus on sound energy from the sensors in the opposite set of transceivers 32.

In the square cross-duct anemometer shown in FIG. 4, the angles across the duct are $$\alpha = \arctan\frac{i}{j}, \theta = \arctan\frac{k}{2h}, \phi = \arctan\frac{k}{h},$$

where i is the height, j is the width and h is diagonal across the square duct. In the velocity measurement of $v_x$, $v_y=v_z=0$ is assumed. Then, the contributions of $v_x$ to the measured velocities are:

$v_{AD}=v_x \cos \alpha$ $v_{BE}=v_x \cos \alpha$ $v_{CF}=v_x \cos \alpha$ $v_{AE}=v_x \cos \alpha \cos \theta$ $v_{BD}=v_x \cos \alpha \cos \theta$ $v_{BF}=v_x \cos \alpha \cos \theta$ $v_{CE}=v_x \cos \alpha \cos \theta$ $v_{AF}=v_x \cos \alpha \cos \phi$ $v_{CD}=v_x \cos \alpha \cos \phi$ Preferably 9 independent measurements of the velocity $v_x$ are made, which can be used to correct any asymmetry in the flow across the duct.

Figure 5:
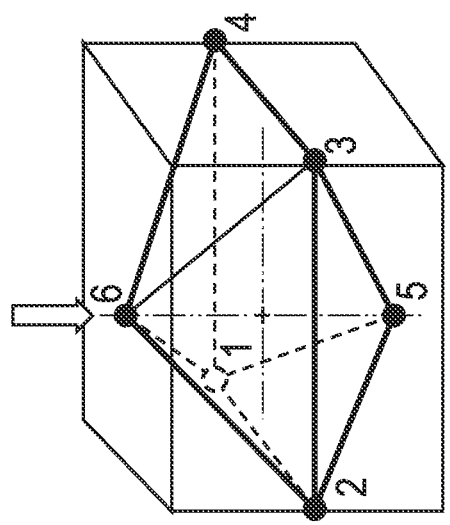
FIG. 5 is a perspective view of the and bi-pyramidal and pyramidal (half) geometry of the sonic pathways in a square duct according to one embodiment of the technology.

The sonic pathways 42 from the emitters traverse the diameter of the duct in the embodiment illustrated in FIG. 4. It can be seen, however, that the sonic pathway distances can be reduced by simple changes to the number and geometry of the opposing receivers while using the same sensing mechanism. For example, one additional transceiver can be placed in the center of the duct creating an apex and producing a pyramidal geometry and thereby cutting the sonic pathway distances roughly in half. Similarly, a second sensor transceiver can be placed in the center of the duct to produce a symmetrical diamond or square bipyramid geometry as shown in FIG. 5 with six transceivers. Each numbered transceiver in FIG. 5 are preferably actuated in a one-pitch five-catch scheme for the bipyramid geometry.

The configuration of sensors into a tetrahedral, pyramid or bipyramid geometries, for example, can measure the airflow in three-dimensions providing redundancy in the air flow and temperature measurements that allow correction of turbulence and irregularities in the duct flow.

As illustrated in FIG. 5 the bipyramidal configuration of transceivers where the distance ranges are cut roughly in half and the design compensates for turbulence in the duct. The axial dimension is parallel to the nominal airflow direction and the 4-polygon base is perpendicular to flow, in the pyramid or bipyramid configuration. The transceivers at the upwind and downwind apexes (numbered 5 and 6 of FIG. 5) will be able to receive the signals from the four transceivers around the base, as well as from the transceiver at the opposite apex. The paths going to from a downwind apex transceiver (5) to side transceivers (1-4) will be directly downwind of the path going from the side to upwind apex transceiver (6). Consequently, the downwind sensors will measure the same wind and by averaging them they will compensate for velocity and temperature errors. The axial dimension can also be compressed to provide the optimum cross-flow angle for both the upwind and downwind paths.

In other words, the upwind/downwind symmetry of the paths means that airflows producing bias in the upwind sonic pathway (e.g., turbulence resulting in airflows at an angle to the nominal down-duct air flow) will be compensated for directly as they traverse the downwind path behind it. This configuration should also detect temperature and airspeed variations across any axis (vertical, horizontal, or diagonal).

The ultrasonic time of flight measurement is performed from each vertex on the bipyramid to each of the other vertices. As a result, there are 18 independent measurements of the time of flight denoted as $t_{XY}, t_{AB}, t_{BA}, t_{AC}, t_{CA}, t_{AD}, t_{DA}, t_{BC}, t_{CB}, t_{BD}, t_{DB}, t_{AE}, t_{EA}, t_{AF},$
$t_{FA}, t_{BE}, t_{EB}, t_{BF}, t_{FB}$ For each pair of measurements $t_{XY}$, $t_{YX}$ we can calculate the wind velocity along the path i-j as:

$$t_{ij} = \frac{l}{c + v_{ij}}, \quad t_{ij} \frac{l}{c - v_{ij}}$$

$$v_{ij} = \frac{1}{2}\left(\frac{l}{t_{ij}} - \frac{l}{t_{ji}}\right)$$

where l is the distance between transceiver i and j. Therefore, for the 18 time of flight pairs there are 9 velocity measurements ($v_{AB}$, $v_{AC}$, $v_{AD}$, $v_{BC}$, $v_{BD}$, $v_{AE}$, $v_{AF}$, $v_{BE}$, $v_{BF}$). Since 4 pairs i.e. ([$v_{AC}$, $v_{BC}$], [$v_{AD}$, $v_{BD}$], [$v_{AE}$, $v_{BE}$], [$v_{AF}$, $v_{BF}$]) represent similar flows, a linear equation can be applied to each to the 5 velocities. A 5×9 transformation matrix that maps velocities on the bipyramidal edges to the overall speeds across different regions of the ducts can be created.

Bipyramidal temperature calculations can also be performed. The ultrasonic time of flight measurement is performed from each vertex on the tetrahedron to each of the other vertices. As a result, there are 18 independent measurements of the time of flight denoted as the following:

$t_{XY}: t_{AB}, t_{BA}, t_{AC}, t_{CA}, t_{AD}, t_{DA}, t_{BC}, t_{CB}, t_{BD}, t_{DB}, t_{AE}, t_{EA}, t_{AF},$
$t_{FA}, t_{BE}, t_{EB}, t_{BF}, t_{FB}, t_{DF}, t_{FD}, t_{CE}, t_{EC}, t_{FE}, t_{EF}, t_{CD}, t_{DC},$
$t_{DE}, t_{ED}, t_{CF}, t_{FC}$

For each pair of measurements $t_{XY}$, $t_{YX}$ we can calculate the temperature along the path i-j as:

$$t_{ij} = \frac{l}{c + v_{ij}}, \quad t_{ij} = \frac{l}{c - v_{ij}}$$

Pyramidal anemometers using a single vertex (rather than the double central vertices used in bipyramidal anemometers) can also be used. The pyramidal geometry would be half of the bi-pyramid and uses five transceivers. with only one apex in the duct center line, in this case it would be one-pitch, four-catch for a base-four-sided pyramid. Virtually all of the design issues and calculations described for the bipyramidal anemometer are the same or closely similar in the pyramidal anemometer embodiment.

Figure 6:
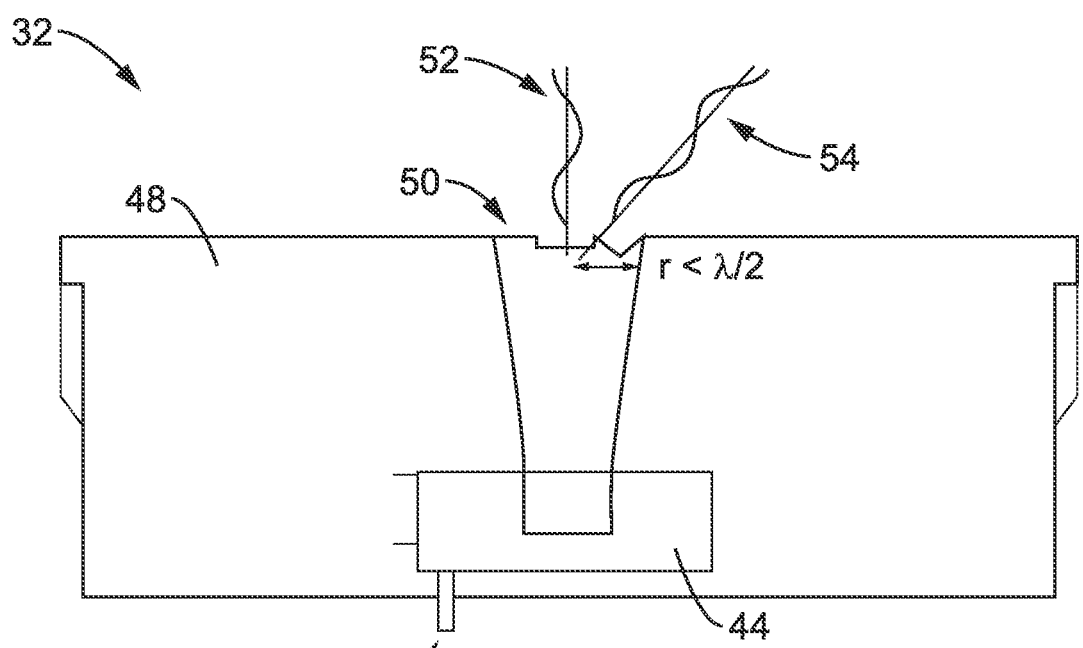
FIG. 6 is a schematic cross-sectional view of a MEMS-based transceiver and housing structure with shaped acoustic port to improve signal strength according to one embodiment of the technology.

The preferred transceiver 32 structure is shown schematically in cross-section in FIG. 6. One preferred omnidirectional transceiver 32 structure has an emitter 48 with an acoustic port 50 with a shape designed to strengthen the transceiver's acoustic signal during both transmitting and receiving events. The shape of port 50 for the duct flow anemometers is bidirectional to amplify signals 42 coming diagonally across the duct 30 from high to low, or low to high, and to reduce sounds reflected off the walls of the duct. The direct horizontal signals are the shortest and the strongest, but the shaped port 50 reduces the difference in signal strength.

The acoustic port 50 has a "horn" or funnel-shape and is oriented over the diaphragm of the sonic elements. The bidirectional port 50 at the transceiver 32 opening amplifies signals into a vertical sheet and reduces unwanted signals, such as reflections off the duct walls. The preferred radius of the opening is less than half of a wavelength ($r<\lambda/2$), thus the two waves 52, 54 will result in constructive interference and a stronger signal. Sound waves are entering an opening 50 where the radius is greater than half a wavelength will diminish each other through destructive interference. In one embodiment, an acoustically-transparent membrane or mesh for dust ingress protection of port 50 may optionally be used to protect the transceiver 32 components.

The embodiment shown in FIG. 6 has a funnel shaped port opening 50 that is 90 degrees full width at half maximum (FWHM) in the vertical axis and 40 degrees FWHM in horizontal axis. This structure enabled an approximately 3-fold signal improvement over the unaided small opening.

The transceiver 32 preferably incorporates a MEMS based piezoelectric ultrasonic transducer (PMUT) 44 with an integrated microcontroller and firmware such as the CH-101 manufactured by Chirp Microsystems, Inc. The transceiver 32 and/or transducer 44 may also include data storage functions, power supply, pressure and temperature sensors and wireless transmitter. Ultrasound data and control signals may also be transferred by wire to a separate module for processing through pins 46. In one preferred embodiment, an Application Specific Integrated Circuit (ASIC) contained in CH-101 is connected to the MEMS piezoelectric membrane that vibrates at approximately 175 kHz when triggered from an electric pulse and other electronics to create a "programmable bat" that transmits and receives when triggered by a microcontroller.

The Room Anemometer embodiments shown in FIG. 7 through FIG. 11 use four sensors as the minimal number of transceivers for three-dimensional (3D) flow definition and reducing the number of obstacles along the path between transceivers. The path geometry produced by four sensors spaced equally is preferably tetrahedral.

Like the duct anemometer, arrangements of ultrasonic sensors are used by the room anemometer to create a set of sound pathways among each pair of sensors. The use of a "one-pitch, three-catch" arrangement means that each transceiver emits a signal in turn and the other three receive it. High frequency sonic pulses of less than a one quarter millisecond are preferably sent in both directions down each path, and the differences in the time-of-flight (TOF) of each signal determine the wind velocity along the path. An algorithm tracks the difference within a single defined sound wave within the sonic pulse, and the method may be guided by a temperature measurement.

The anemometers may optionally include a built-in temperature sensor, a built-in magnetic compass/accelerometer (tilt) sensor to permit the instrument to self-orient, and a built-in radio for wireless communication to a router/internet. A cone shape or omnidirectional acoustic port of the sensor may boost the signal from noise in all directions.

Figure 7:
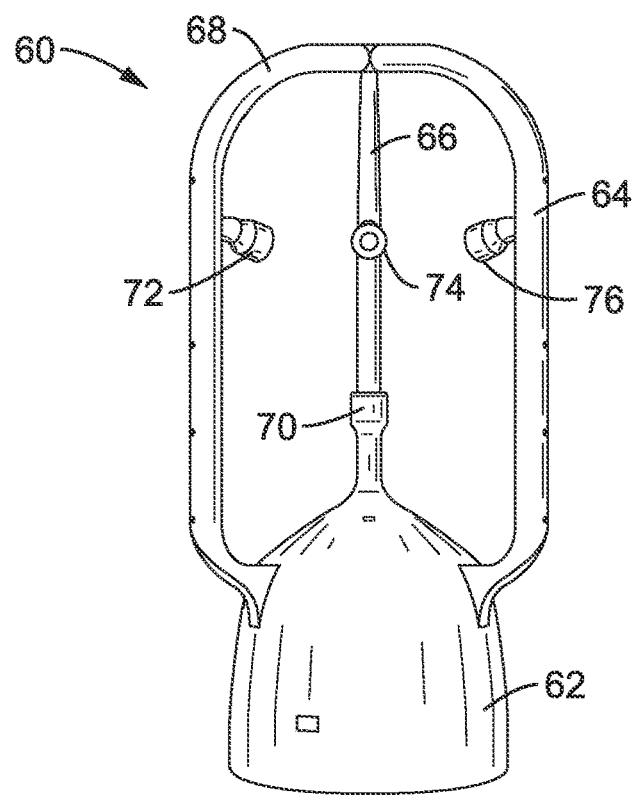
FIG. 7 is a side view of a room anemometer structure with compact support struts and transceivers in a tetrahedral sonic pathway configuration.

Referring now to FIG. 7, one embodiment of a room air velocity (RA) anemometer 60 that uses an array of four transceivers to measure the direction and the three-dimensional components of air movement. It can also be used as an omnidirectional air speed sensor. It can be suspended on a string from the ceiling and will detect its compass orientation magnetically. It can also be unobtrusively mounted on a pedestal extending from workstation surfaces like desktops or partitions. The device can operate standalone singly or with multiple devices that are wirelessly connected to a control.

Figure 8:
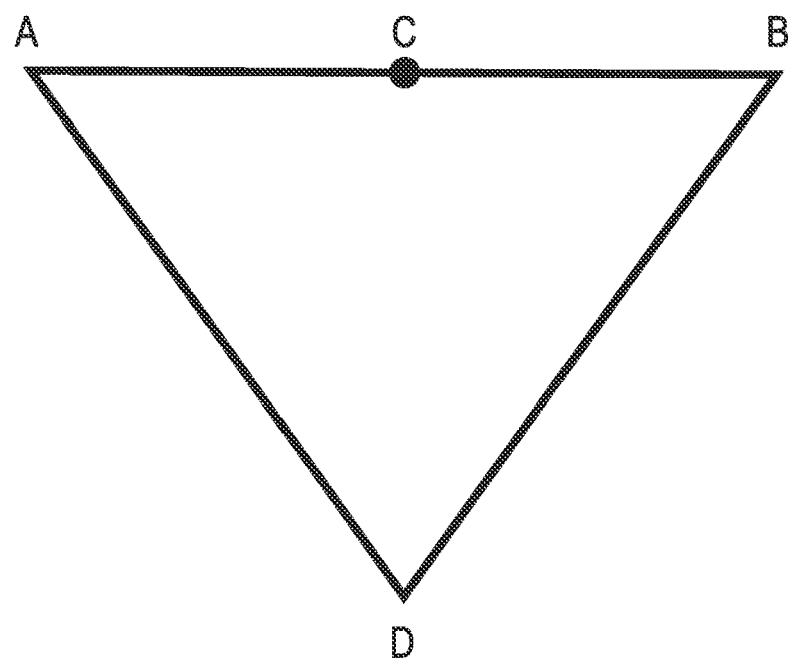
FIG. 8 is a schematic side view of the in tetrahedral sonic pathway configuration of the device of FIG. 7 and FIG. 11.

In the embodiment shown in FIG. 7 and FIG. 8, the device has a base 62 with three generally vertical support struts 62, 64, 68 that are mounted to the base 62. The struts in this embodiment are joined at the top to give rigidity to the structure, alignment to the sensors and to limit movement of the struts in moving air. The base 32 has a base transceiver 70 oriented substantially vertical. Strut 68 has a transceiver 72 mounted to it that is oriented towards a central location in the space between the vertical struts 64, 66, 68. Likewise, strut 66 has a transceiver 74 and strut 64 has transceiver 76 oriented towards the central vertical axis of the structure. As shown in the top view of FIG. 9, the struts 64, 66, 68 are equally spaced from each other around the circumference of the base 62. In one embodiment, the struts have a teardrop shaped cross-section to reduce wake effects.

Figure 9:
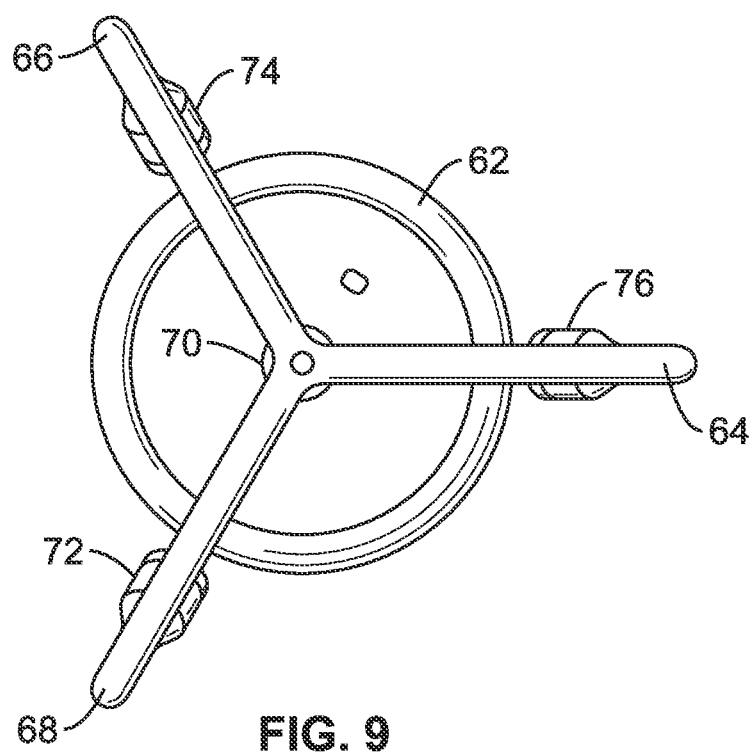
FIG. 9 is a top view of the room anemometer structure with compact support struts and transceivers of FIG. 7.
Figure 10:
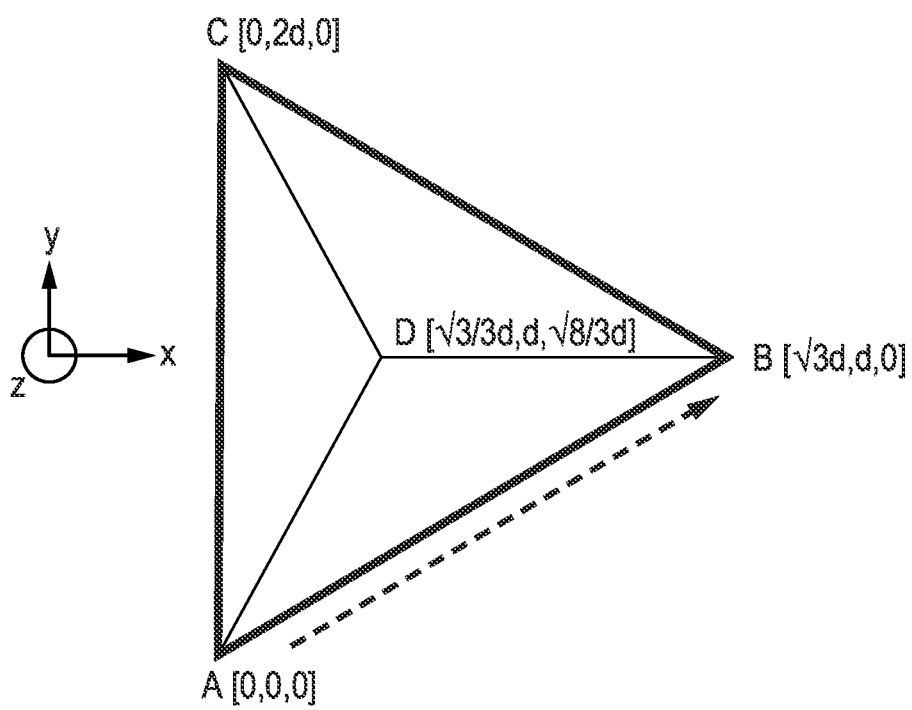
FIG. 10 is a schematic top view of the geometrical configuration of the sonic pathways of the tetrahedron in the anemometer of FIG. 7 and FIG. 11.

As seen in the side view diagram of FIG. 8 and top view of FIG. 9 and the diagram of FIG. 10, the transceiver sensors are preferably placed at the vertices of an isosceles tetrahedron formation. In FIG. 8, transceiver 70 is located at position D, and transceiver 72 at position A, transceiver 76 at position B and transceiver 74 is located at position C of FIG. 8.

This configuration allows 3-dimensional velocity to be calculated with redundancy, which can be used to detect and correct errors that may be introduced by aerodynamic wakes from the support structure.

Figure 11:
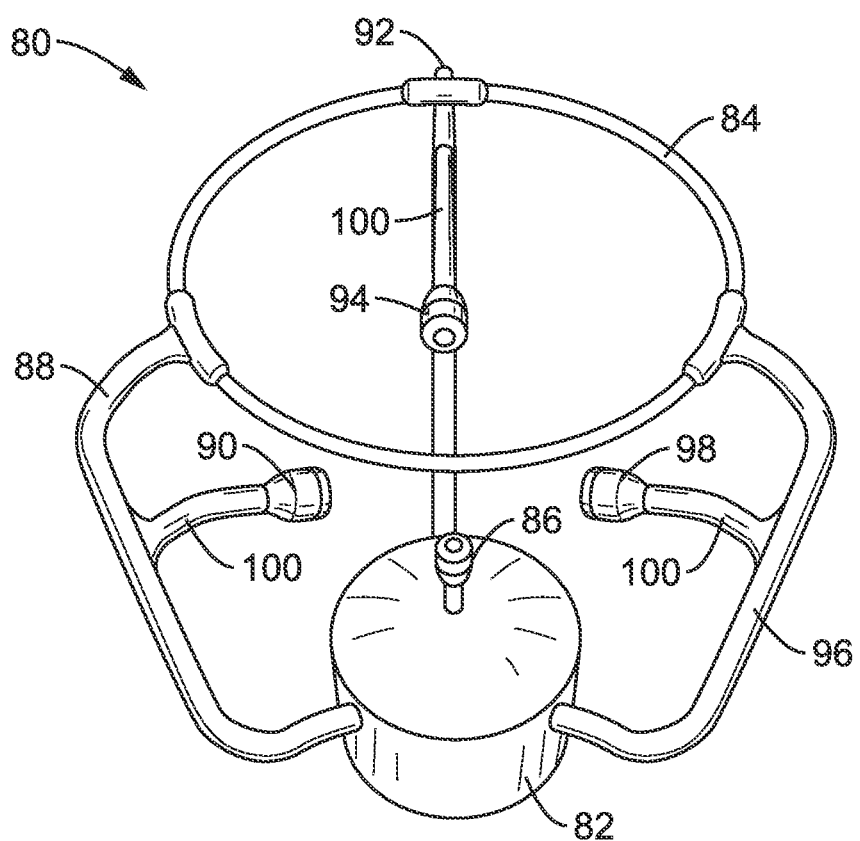
FIG. 11 is a side view of a room anemometer structure where the supporting struts are moved away from the center and transceivers in a tetrahedral sonic pathway configuration.

An alternative embodiment of the room anemometer 80 is shown in FIG. 11. The device 80 has a base 82 that contains the power supply, communications functions, processing functions and optional compass and temperature sensors. The base 82 may have fasteners so that it can be fixed at a desired location. The base 82 also has a base transceiver 86 oriented along a central vertical axis.

Mounted to the base 82 are three equally spaced support struts in a generally vertical orientation that are connected at the top to a ring structure 84. The first strut 88 has a transceiver 90 directed generally towards the central vertical axis of the device. The second strut 92 has a transceiver 94 and the third strut 96 has a transceiver 98 similarly oriented towards the central vertical axis at the center of the base 82.

In the embodiment shown in FIG. 11, the support struts 88, 94, 96 are pulled outward and away from the transceivers 90, 94, 98 with the intent of reducing the aerodynamic wake influence of the three struts on the signal paths. However, the sonic pathways utilize the same tetrahedral geometry as the embodiment shown in FIG. 7 and FIG. 10.

If reflected waves arrive in the receiver sufficiently soon after the original signal, they can cause noise in the received signal. To remove any possible sound reflections, the distance from a transceiver to the closest solid surface should exceed approximately 2 cm. Streamlined stubs 100 hold the transceivers 90, 94, 98 away from the struts to reduce wakes. In another embodiment, the vertical struts 88, 94, 96 have a "teardrop" cross section facing outward in order to minimize and stabilize wakes within the tetrahedron. In this embodiment of the room anemometer, the support struts have a teardrop-shaped cross section, with the pointed end toward the center of the tetrahedron. This configuration has two purposes: 1) to reduce the size of eddies that are shed into the sonic pathways where the measurements are made, and 2) to minimize the energy of the reflected soundwaves that might possibly be reflected into the receiving sensor that is mounted on the strut. The base 82 of the anemometer also has an elevated extension or stub to support the lower sensor 86, to minimize any flow acceleration or blockage caused by the anemometer body present below the sensor 86.

The ultrasonic time of flight measurement is performed from each vertex on the isosceles tetrahedron to each of the three other vertices. As a result, there are 12 independent measurements of the time of flight denoted as $t_{XY}$:

$$t_{AB}, t_{BA}, t_{AC}, t_{CA}, t_{AD}, t_{DA}, t_{BC}, t_{CB}, t_{BD}, t_{DB}, t_{CD}, t_{DC}$$

For each pair of measurements $t_{XY}, t_{YX}$ we can calculate the wind velocity along the path i-j as:

$$t_{ij} = \frac{l}{c + v_{ij}}, \; t_{ij}\frac{l}{c - v_{ij}}$$

$$v_{ij} = \frac{1}{2}\left(\frac{l}{t_{ij}} - \frac{l}{t_{ji}}\right)$$

where l is the distance between transceiver i and j. Therefore, for the 12 time of flight pairs there are 6 velocity measurements ($v_{AB}, v_{AC}, v_{AD}, v_{BC}, v_{BD}, v_{CD}$).

Cartesian components of the wind velocity vector $\vec{v} = v_x \vec{i} + v_y \vec{j} + v_z \vec{k}$, where $\vec{i}, \vec{j}, \vec{k}$ are the unit vectors along the x, y, z axes are calculated form the following linear equation:

$$\begin{bmatrix} v_x \\ v_y \\ v_z \end{bmatrix} =$$

$$\begin{bmatrix} \frac{1}{5\sin(30)*\cos(54.74)} & \frac{1}{5\sin(60)} & 0 & \frac{1}{5\cos(54.74)} & -\frac{1}{5\sin(30)*\cos(54.74)} & -\frac{1}{5\sin(60)} \\ \frac{1}{5\sin(60)*\cos(54.74)} & \frac{1}{5\sin(30)} & \frac{1}{5} & 0 & \frac{1}{5\sin(60)*\cos(54.74)} & \frac{1}{5\sin(30)} \\ -\frac{1}{3\sin(54.74)} & 0 & 0 & \frac{1}{3\sin(54.74)} & \frac{1}{3\sin(54.74)} & 0 \end{bmatrix} *$$

$$\begin{bmatrix} v_{AD} \\ v_{AB} \\ v_{AC} \\ v_{DB} \\ v_{DC} \\ v_{BC} \end{bmatrix}$$

This 3×6 matrix is the transformation matrix that maps velocities on each tetrahedron edge to the overall 3D velocity. Given the 3-dimensional components of the velocity, we then calculate the overall airspeed, azimuth (horizontal angle) which is the flow angle in the horizontal plane of the anemometer (i.e. the plane that has A, B, and C transceivers), and the vertical angle which is the flow angle in the plane perpendicular to the plane of the A, B, and C transceiver. The positive directions of the angle are based on:

$$\text{air speed} = \|v\| = \sqrt{v_x^2 + v_y^2 + v_z^2}$$

$$\text{Azimuth (Horizontal Angle)} = \tan^{-1}\frac{v_x}{v_y}$$

$$\text{Vertical Angle} = \tan^{-1}\frac{v_z}{\sqrt{v_x^2 + v_y^2}}$$

However, the anemometer may be employed in a horizontal or other tilted application. With a 3-axis accelerometer in the anemometer board, the tilt should be measurable. Accordingly, the coordinate system should be transformable to the global coordinate system.

The three support struts and the base of the enclosure provides two types of flow shielding that could diminish the accuracy due to incorrect velocities on the affected paths. However, the redundancies in the measurements along the tetrahedral pathways also allow blocked paths to be excluded from the calculation and replaced with measurements from paths that are unaffected.

Figure 12:
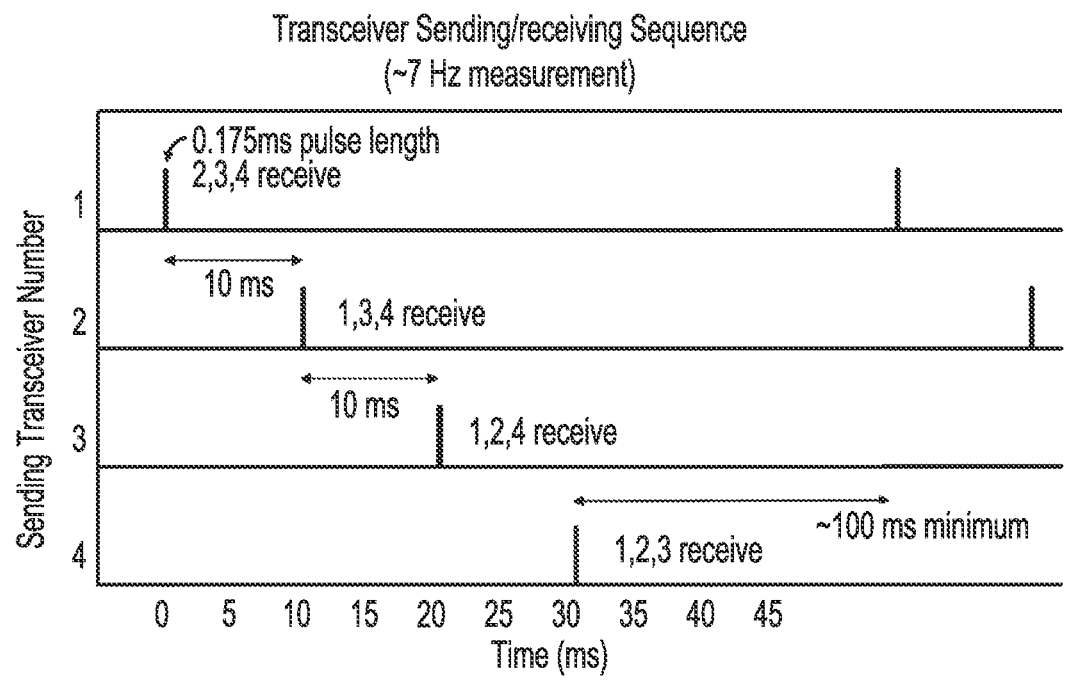
FIG. 12 is a graph of a typical sequence of transmission among four transceivers. For a four-transceiver anemometer, each transceiver sends a pulse in turn, offset by 10 ms in this example. The other three receive the transmission. With 10 ms delay between pulses, the maximum measurement is 25 Hz however lower preferred range is 2-6 Hz with much longer delays between sets of pulses.

In the four-transceiver anemometer, for example, each transceiver sends a pulse in turn, offset by a time period (10 ms) and the other three receive the transmission as illustrated in FIG. 12.

In the six-channel cross-section duct anemometer embodiment, the transceivers are grouped into two sets of three that are on opposite brackets. As with the room anemometer, one of the six is chosen to be the primary (transmitting) transceiver though the data is only read out from the three opposing transducers (on the opposite sensor element). This means that although there are six transceivers, each individual measurement still only yields 3 sets of IQ data. The full measurement set is then the 18 sets of I/Q data (3 for each of the six transceivers). The three-dimensional bipyramid duct anemometer uses a similar timing sequence with a one pitch-five catch scheme as seen in FIG. 5.

Once the data from the transceivers is received, it is analyzed by the processor to get the time-of-flight signals as well as the air speed. The received data from the transceivers is preferably transmitted in aggregated measurements where each measurement contains three sets of minimized I/Q data corresponding to the three receiving transmitters for each primary, for example.

The central control computer programming reads and processes the transmitted raw data to derive both air flow, velocity, and temperature. The results can be periodically displayed and stored. Programming in the central control computer can also control the building environmental conditioning system in view of the sensor results.

The technology described herein may be better understood with reference to the accompanying examples, which are intended for purposes of illustration only and should not be construed as in any sense limiting the scope of the technology described herein as defined in the claims appended hereto.

Example 1

Figure 13:
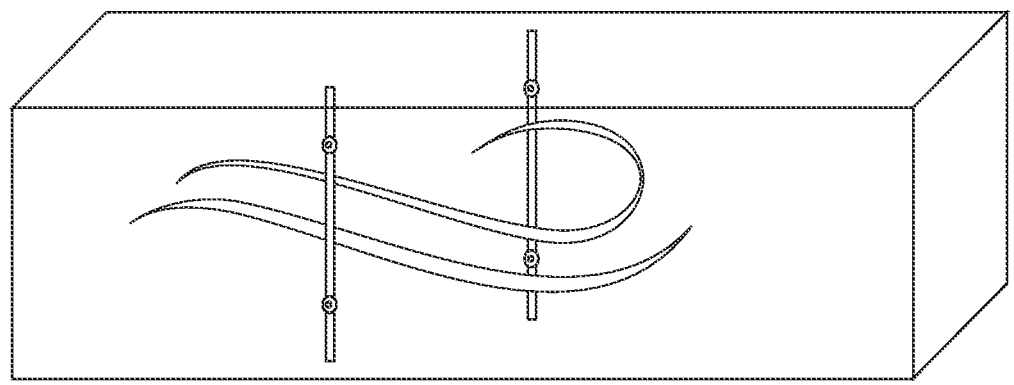
FIG. 13 is a side view of a duct anemometer application showing turbulence.

To illustrate the functionality of the duct flow anemometer system, transceivers were mounted on vertical brackets on opposite sides of a square-section wind tunnel, as shown in FIG. 13. The brackets were separated by 16.5 cm and staggered at 17 degrees with respect to the direction of airflow. This was done to provide the necessary downwind distance and assure that the wake of the upwind sensor did not affect the airflow in the path between the transceivers. If one of the brackets were moved further downwind from the other bracket, the angle between the line connecting transducers and wind direction is increased and the sensor becomes more sensitive to variations in airspeeds. On the other hand, if the line connecting two transducers approaches perpendicular to the flow, the TOF and therefore airspeed become insensitive to changes in the airflow.

The transceivers used in this anemometer were miniature, ultralow power ultrasonic time-of-flight range sensor (CH101) from Chirp Microsystems. Based on AlN (Aluminum Nitride) piezoelectric MEMS technology, the CH-101 is a system-in-package that integrates a PMUT (piezoelectric micromachined ultrasonic transceiver) together with an ultralow power SoC (system on chip) in a miniature, reflowable package. The SoC runs Chirp's ultrasonic Digital Signal Processing (DSP) algorithms and includes an integrated microcontroller that provides digital range readings via InterIntegrated Circuit (I2C).

The Application Specific Integrated Circuit (ASIC) contained in CH-101 was connected to the MEMS piezoelectric membrane that vibrates at approximately 176 kHz. The system was designed to be triggered by a microcontroller so that all of the transceivers in the system could be synchronized to start transmitting or recording synchronously.

Custom anemometry software controlled the measurement process and permitted the microcontroller to read out the IQ data. Each sending-receiving cycle required about 10 ms to allow the ultrasound to decay to an undetectable level and avoid a pulse from the previous measurement being detected during the current measurement. Since each transceiver in the system takes a turn transmitting, the full time to complete one measurement is N times 10 ms, where N is the number of transceivers. Therefore, the maximum possible measurement rate is approximately 25 Hz in systems with four CH-101 transceivers. However, such frequency is not often needed for capturing variations in the real-world indoor air velocity environment. The system was triggered by a Microchip SAM-R21 at a measurement rate of 2 Hz. Raw IQ data was sent from the CH-101s in the system through the SAM-R21 to a PC which processed the signal from raw IQ data.

The ultrasonic anemometer was tested in a small custom-built wind tunnel since it is too large for most calibration wind tunnels such as the Omega model WT4401-S). To ensure that the airflow in the tunnel is uniform, a calibrated hotwire probe was used to measure airspeeds at 9 locations in a 3×3 mesh of the tunnel at a low speed (0.68 m/s) and a high speed (2.52 m/s). The standard deviation of measurements was 0.02 m/s for low speed and 0.05 m/s high speed, demonstrating uniform flow in the tunnel. A series of air speeds was tested ranging from 0 m/s to 4 m/s, using a 0.25 m/s step below 1 m/s and 0.5 m/s afterwards, all at 23° C. Each airflow rate period was set to 30 seconds intervals with at least 15 seconds of transition time between each step to allow the fan rotation to stabilize.

While this example focused on the calculation of TOF times for a single pair of transducers, various formations of the transducers can also obtain 2D and 3D measurements of air velocity and volumetric air flow as well as used in air ducts for measuring average speed passing through the cross-section of a duct.

Example 2

To demonstrate the functionality of the room anemometer apparatus and system, an anemometer with the support structure shown in FIG. 7 was prepared and air and turbulence tested and the results compared with two conventional hotwire sensors.

The anemometers used a tetrahedral arrangement of four transceivers, the smallest number able to capture a 3-dimensional flow providing greater measurement redundancy than in existing anemometry. The sonic pathways were set along the axes of a 60 mm tetrahedron and operated in a single-pitch, three-catch arrangement. The anemometer also measured temperature and has a compass and tilt sensor so that flow direction is globally referenced regardless of anemometer orientation.

In this illustration, the length of the sound paths in the AV tetrahedron is about 6 cm (0.06 m). Distance divided by velocity gives the time of flight of the ultrasonic pulse. The speed of sound in still air is 340 m/s. To this one must add or subtract the velocity component of the wind that is aligned with the sound path.

For the AV in still air:

$$\text{Time}_{A \rightarrow B} = D/340 = 0.06/340 = 1.765 \times 10^{-4} \text{ sec} = 176.5 \mu \text{ sec}.$$

For the AV in a 0.05 m/s wind:

$$\text{Time}_{A \rightarrow B} = D/(340 + V_{wind}) = 0.06/340.05 = 1.76445 \times 10^{-4} \text{ sec} = 176.445 \mu \text{ sec};$$

$$\text{Time}_{A \leftarrow B} = D/(340 + V_{wind}) = 0.06/339.95 = 1.76496 \times 10^{-4} \text{ sec} = 176.496 \mu \text{ sec}; \text{ and}$$

$$\text{Time difference} = 0.00051 \times 10^{-4} \text{ sec} = 5.1 \times 10^{-8} \text{ sec} = 0.05 \mu \text{ sec}.$$

This was the maximum time difference observed when the wind was aligned with the sound path. The other legs of the AV tetrahedrons measured lower time values following the coefficients described above. The time difference increased in direct proportion to the wind speed.

In comparison to the sound time of flight, the actual time for the 0.05 m/s wind to traverse the 0.06 m path was 1.2 sec. This might also represent the time for a 0.6 m diameter eddy to pass through the anemometer; many velocity measurements might be made within this time interval. This traverse time is shorter at higher wind: a 1 m/s wind takes 0.06 sec, and a 20 m/s wind takes $3 \times 10^{-3}$ sec.

Algorithms detected and eliminated shielding errors caused by the wakes from anemometer support struts. The anemometer demonstrated a resolution and starting threshold of 0.01 m/s, an absolute air speed error of 0.05 m/s at a given orientation with minimal filtering, 3.1° angle and 0.11 m/s velocity errors over 360° azimuthal rotation, and 3.5° angle and 0.07 m/s velocity errors over 135° vertical declination.

The anemometer support structure struts were 7 mm wide to house the 4 mm ribbon cable connecting the CH-101 transceivers to the carrier board, and the transceivers were mounted flush with the struts. The total distance between the transmitter, the closest reflective surface to both transmitter and receiver, and the receiver, should be greater than the direct distance between transmitter and receiver plus the distance traveled by the ultrasonic waves between the onset and the peak of the arriving pulse (reflections arriving after the peak do not influence TOF measurement). In order to completely avoid any detrimental reflections in the anemometer, the distance from a transceiver to the closest reflecting strut surface was greater than 2 cm.

The room anemometer structures were tested in the upper gradient-wind level of a large open-circuit boundary layer wind tunnel (measurements at 1.2 m height in the 1.52 m high, 2.13 m wide cross section). At this height the tunnel has low natural turbulence intensity (under 3%) at mean air speeds below 2 m/s.

All data were collected in 60-second periods. Ultrasonic air speeds were tested against adjacent measurements from two hotwire sensors calibrated in a NIST-certified calibration wind tunnel using a differential pressure sensor (Omega model WT4401-S]). The hotwire sensor models were SensoData 5500 and TSI 9515. In addition, an outdoor ultrasonic anemometer (Young model 81000) was measured alongside for comparing mean and turbulence measurements. Wind approach angles were obtained using a protractor-equipped Bogen tripod support. Azimuthal (yaw) angles were obtained by horizontally rotating the anemometer, and downward- and upward-directed airflow angles (respectively negative and positive pitch) by tilting it forward and backward relative to the flow.

With the anemometer in a no-shielding condition (0° yaw angle), data for 10 different air speeds (0, 0.5, 1, 1.5, 2, 2.5, 3, 3.5, 4, 4.5, 5 m/s) were collected. Six m/s is the upper limit for the hotwire sensors and the airspeed measurements were compared. For the test anemometer, the mean absolute error was 0.11 m/s and the normalized mean absolute error is ±4.0% of reading (±1% of full scale). For the RM Young anemometer, the mean absolute error was 0.20 m/s and the normalized mean absolute error is ±7.7% of reading. These values are within the accuracies reported for commercial hotwire and meteorological ultrasonic anemometers.

Turbulence intensities were also measured. The TI measurements from the two ultrasonic anemometers were compared over a range of wind tunnel velocities, using a 60 second measurement interval at each velocity. Both anemometers were adjacent and measuring the same time interval. Their outputs could only be compared qualitatively, because their internal processing was not the same. The test ultrasonic anemometer was sampling at 6 Hz, resulting in 360 samples over the 60 seconds. A variable-length median filter was available for suppressing spike values. The TI is the standard deviation (SD) of the filtered samples divided by their mean.

TI values with two widely differing median filters applied (3- and 15-measurement lengths) were recorded. With no filter, the highest value at 0.5 m/s is 0.2. In contrast, the Young 81000 collects measurements at 25 Hz but internally processes 20 readings before outputting single values for mean and SD, resulting in a 1.25 Hz sample rate and 75 samples over the 60 sec. The TI for the Young 8100 was evaluated in two ways: 1) the TI value for each sample was calculated by dividing the SD by its associated mean, and then averaged the 75 TI values. 2) the standard deviation of the 75 mean values was calculated and divided by their overall mean. The two methods describe high-frequency and low-frequency components of turbulence measured by the Young 8100. The tested ultrasonic TI is close to that of the Young 8100 at higher wind tunnel velocities but reads higher values at lower velocities, especially at 0.5 m/s to 1 m/s levels.

Pitch angles and speed testing was also performed. The pitch axis tests were applied for all upward- and downward-directed flows, repeating them at the three yaw angles (0°, 30°, and 60°) that represent the greatest range of shielding effects from the struts. There is no shielding at 0° yaw until the flow approaches vertical and the overhead struts have an effect. At 30° and 60° yaw, the struts shielded the airflow along one or more paths and heuristics were triggered. At 30° yaw, the shielding error is induced along one of the top triangle paths (A to B in FIG. 10), while at 60° yaw, the error comes from the shielding by the upstream anemometer arm of the upstream vertical path (e.g. A to D in FIG. 10).

The anemometer's usable range of pitch angles for the three yaw cases was also evaluated. Upward flows greater than 35° above horizontal are being distorted by the presence of the anemometer base, causing the pitch to be underestimated for all yaw angles. All other angle predictions are close to the actual, including those for vertical downward air flows. The mean error across all pitch angles for 0° yaw is 3.03°, with 3.93° SD; at 30° yaw the mean error is 2.77° with 4.14° SD, and at 60° yaw mean error is 3.90° with 3.74° SD.

The anemometers were able to measure speed below 0.2 m/s for all azimuthal directions with fair accuracy (0.02 m/s MAE). The current 6 cm sonic pathlength, sampling at 6 Hz, is capable of oversampling turbulence at the frequencies affecting human comfort perception (~1 Hz).

Additionally, the power requirements of the system in wireless mode were sufficiently low that they could enable battery-life numbers in the years, which makes the anemometer useful for long-term untethered building monitoring applications. Sampling frequencies of 2 Hz and below are appropriate for most types of long-term indoor monitoring applications, while extending the battery life linearly.

Unlike other ultrasonic anemometers that require three dedicated pairs of transceivers, this design employs a tetrahedral configuration of four ultrasonic transceivers cycling in a one-send three-receive mode. This is the minimum number of transducers capable of capturing a 3-dimensional flow, while also providing complete redundancy in the data needed to calculate the vector. The algorithms use the redundancy to infer and eliminate errors from the aerodynamic wakes shed by the anemometer's struts and base. Validation testing showed that the anemometer prototypes have high accuracies in measuring velocity, temperature, and the azimuthal and vertical angles of wind direction.

Example 3

The ability to accurate measure air movement has been difficult and is expensive over extended periods of time, especially for velocities below 1 m/s. To increase the limited air velocity range possible in high frequency phase-based ultrasonic anemometers, new time-of-flight calculation methods that surpass the half-cycle limit in existing phase-based calculations were evaluated. Three approaches were tested to extend the range. The methods were validated in a very high frequency anemometer using MEMS ultrasonic transceivers containing an AlN piezoelectric micromachined ultrasound transceiver. The results demonstrated a high goodness of fit (average room mean square of 0.1294 m/s and the average mean absolute error of 0.0542 m/s) for capturing actual air velocities in the experimental setup. With a filter rate of 15 frame lengths in the filter, an absolute error of 0.0263 m/s was calculated, surpassing the sensitivity of many current commercially available products.

To increase the detection range measured by phase-difference ultrasonic anemometers, three algorithms that use the complex phase angle of an ultrasonic pulse to measure velocity and temperature over extended ranges of temperature and velocity were demonstrated and compared. They employ heuristics to track the vibration cycle of the measured phase angle.

The three heuristic-based methods: (1) Chained half-cycle-limit, (2) Magnitude-guided, (3) Temperature-guided approaches are intended to increase the range of velocities measurable by the instrument, to automatically recover from the loss of phase cycle during rapid temperature changes, and to allow long-term operation with minimal energy demand. These methods are applied in a pulse-based anemometer whose 176 kHz MEMS transceivers both transmit and receive. In wind tunnel tests between 0-4 m/s, the tracking algorithm with a low-pass filter measured air speed with high sensitivity and accuracy (0.026 m/s mean absolute error).

These methods can all be applied to pulse-wave methods. The chained half-cycle method and temperature-guided methods can also be used in continuous wave methods of determining time of flight. Each of these phase-tracking methods determines the cumulative relative phase difference ($\Delta \varphi_{t,0}$), representing the total TOF difference between an initial calibration and the current measurement.

Pseudocode for the chained half-cycle-limit algorithm is illustrated in Table 1. Pseudocode for magnitude-guided algorithm is shown in Table 2 and pseudocode for temperature-guided algorithm is shown in Table 3.

The Chained Half-cycle-limit Algorithm "chains" together phase measurements across wavelengths (cycles) by applying the within-a-half-cycle assumption to each preceding measurement, rather than the initial measurement, and then accumulating them. In this method, it is assumed that the phase shifts (clockwise and counterclockwise rotation within 0-360 points) occurs around the horizon with a freedom of rotation between 0-360 degrees, changing the wave cycle by at most one. When the phase wraps around in either clockwise or counter-clockwise directions, it enters the adjacent wavelength. The phase at time t ($\varphi_t$) is assumed to be within the half cycle around the phase at the time t−1 ($\varphi_{t-1}$), and $|\varphi_t - \varphi_{t-1}| < 1800$ was used as a heuristic to determine the rotation direction.

Two data filters were applied to buttress this assumption. In the first filter, we drop any point within 50° of a 180° shift (outlier range in the code of Table 1), to filter out samples that could cause the algorithm to lose track of the current TOF estimate. If the only attempt is to find the closest rotation angle of an absolute phase to determine its relative phase, an undesired jump in phase may be observed. For example, in a low air velocity situation we have a stream of absolute phases with a noise spike: −20, 10, 0, 20, −170, −20. A closest rotation interpretation would produce the relative phases −20, 10 (+30), 0 (−10), 20 (+20), 190 (+170), 340 (+150). The +170 and +150 relative phase difference total 320 which is a misinterpretation of a spike into a very sudden increase in the flow. Therefore, in the chaining algorithm, all points within a certain number of degrees from 180 are rejected. If this number is set at 50, then a maximum of 130-degree phase shift is allowed. Thus, the −170 point was discarded as noise, and the following point −20 was compared to the previous point 20, and thus retained as data.

In the second filter, any point where the change in phase differences between the next point and the current point and the current point and the previous point, is greater than 120° (i.e. jerk_limit in Table 1) is dropped. For example, using an outlier threshold of 50 degrees from the first filter, a collection of consecutive relative phases in the stream 20, 140, −20, −40, etc. are considered and 140 is noise. In this case, the first filter would not deduce that 140 is noise and would then erroneously conclude that 140 is valid and −20 is noise and continue to assume the rest of the stream is noise until another point comes within (180−50) of 140. To address this, evaluation of the point after 140 was used to determine validity of the 140. Specifically, if the phase difference between a point and its predecessor and its successor are large, and the predecessor and successor are close, then the current point is likely to be noise and can be rejected. The TOF is then calculated based on the calibration period phase and natural frequency as the phase changes with each successive measurement using the equation: $TOF_t = TOF_{t-1} + (<\varphi_t - \varphi_{t-1})*\frac{1}{2}\pi f_n$.

This algorithm is expected to work under scenarios where the phase changes less than half a cycle (180°) between each successive measurement. At high measurement frequency (higher than 10 Hz), there are few physically plausible causes for a full-cycle jump within two measurements. However, at lower measurement frequencies, the phase difference due to air speed, change in speed of sound, or sudden change in the orientation of the anemometer might change by more than half a cycle and cause a permanent error in the $\Delta\varphi_t$. There is no automatic recovery from this error.

The Magnitude-guided Algorithm uses the variable wave magnitude in pulses to assist detecting the cycle of the measured phase; to enable a wider measurement range exceeding the half-cycle limit. The algorithm is presented in Table 2. During the calibration period, the magnitudes at the sampling point i ($M_{0,i}$) and the previous sampling point i−1 ($M_{0,i-1}$) were also measured. For n wavelengths between sampling points i and i−1, define waveMag as $M_{0,i} - M_{0,i-1}/n$. This is used to calculate the expected values of magnitudes ($EM_{t,j}$) of the observed phase ($\varphi_t$) at j wave numbers (j∈[−3, −2, −1, 0, 1, 2, 3]) on both sides of the initial calibration wave and then use brute-force search to find the j that minimizes $EM_{t,j} - M_t$. The j, $\varphi_0$, and $\varphi_t$ values are used to calculate $\Delta\varphi_t$ as shown in Table 2. By not having to constantly keep track of phase, lower sampling rates are enabled that lowers the chance of incorrect phase estimations caused by sudden temperature or velocity changes that might shift the phase more than half a cycle at any sampling time t. The TOF is then calculated based on the calibration period $TOF_0$ and the derived $\Delta\varphi_t$.

The results from this algorithm might become noisy in extreme environmental conditions, since the vibration magnitude is impacted more than phase angle by changes in temperature and other external high-frequency vibration sources such as from scraping metal. Adding the magnitude value does however provide a mechanism for automatic recovery from error without needing recalibration in still air.

The Temperature-guided Algorithm might be integrated with a physical temperature sensor positioned in the airstream. The temperature guided algorithm is presented in Table 3. The measured temperature can guide a search for locating the cycle of the current phase angle relative to the calibration phase angle. For a pair (a and b) of transceivers' calibration phases ($\varphi_{0,a-b}$, $\varphi_{0,b-a}$) and temperature ($T_0$), temperature at time t ($T_t$) is used to estimate the no-airflow phase for both paths at time t ($\varphi_{t,a-b}$, $\varphi_{t,b-a}$). The difference between the measured phases and the calculated no-airflow phases are due to the air speed, the difference in temperature measured by the sensor, and the temperature that actually impacts the pair's TOF.

The part of the phase difference that comes from air speed and what comes from temperature differences is then distinguished. The original estimate of phase difference ($\varphi_{t,a-b}$, $\varphi_{t,b-a}$) is corrected to calculate air-speed-induced phase differences ($\Delta\varphi_{t,a-b}^{AF}$, $\Delta\varphi_{t,a-b}^{T}$, $\Delta\varphi_{t,b-a}^{T}$), relying on the pragmatically based assumption that the airflow-induced TOF is smaller than half a cycle ($0.5/f_n$). Since phase differences from air speed are opposite for both directions and temperature differences are the same, the relative contributions can be separated by the method in Table 3. The $\Delta\varphi_t$ required for TOF estimation is then calculated as the sum of $\Delta\varphi_{t,a-b}^{AF}$ and $\Delta\varphi_{t,a-b}^{T}$ for path (a-b), and the sum of $\Delta\varphi_{t,b-a}^{AF}$ and $\Delta\varphi_{t,b-a}^{T}$ for the path (b-a). The algorithm applies only to pairs of transceivers. The algorithm enables automatic correction of cycle determination errors without the need for a recalibration period in still air.

It should be noted that the maximum airspeed-induced TOF measurable by the temperature-guided method must be within a half phase cycle ($0.5\,f_n$) neighborhood of the TOF in the still air calibration value corrected for temperature. The corresponding maximum upwind and downwind velocities possible for the anemometer can be derived from $V_{max}$.

The maximum measurable velocity is thus an inverse function of the distance between the transceivers. At a natural frequency of 176 kHz, a distance between transceivers of 6 cm, and the speed of sound of 343 m/s, the maximum velocity would be +5.5 m/s, and −5.7 m/s. Lower natural frequencies would allow approximately linear increases in maximum measurable velocities.

The three algorithms for increasing the range and reliability of air velocity and temperature detection were evaluated with a high-frequency pulsed-wave anemometer provided positive results. The chained-half-cycle method worked best under scenarios where the phase changes less than half a cycle (180°) between each successive measurement point. Chaining sequential measurements increased the range of velocities addressable by the anemometer. However, at lower measurement frequencies appropriate for indoor anemometry (less than 10 Hz), plausible abrupt changes in air velocity, speed of sound, or physical displacement of the anemometer) might produce a phase difference that exceeds half a cycle and causes a permanent error in the $\Delta\varphi_t$. This error is not automatically recoverable.

The magnitude-guided algorithm produced imperfect results in the system due to inconsistencies in the magnitude measurements from the transceivers in the system. However, this algorithm ideally has none of the half-cycle limitations that other methods have. It would work for systems with well-behaved magnitude measurements and autorecover from phase difference errors.

The temperature-guided algorithm is reliable at capturing large phase differences caused by large changes in air velocity, temperature, or both. This method required a temperature sensor within the measured air flow. Since the temperature measurements are only used to guide the search to find the phase cycle, they can be moderately noisy (±2K for our sensing system). In flows with highly non-uniform temperatures, differences between the average temperature of the transceiver path and the temperature sensor reading will cause incorrect velocity calculations, but it will recover and work properly once the non-uniformity subsides. It should be noted that ultrasonic anemometers capture the average speed across the paths connecting transceivers. This serves to capture the volumetric air flow in ducts. However, they are not capable of measuring air speeds at a single point similar to hot wire anemometers.

Accordingly, the sensing system can be used in air ducts for measuring average speed passing through the cross-section of a duct. However, various formations of the transducers can also obtain 2D and 3D measurements of air velocity and volumetric air flow.

From the description herein, it will be appreciated that the present disclosure encompasses multiple embodiments which include, but are not limited to, the following:

An anemometer apparatus, comprising: (a) a plurality of ultrasonic transceivers oriented towards each other in three-dimensional space, the transceivers configured to transmit and receive soundwaves along paths between transceivers;

and (b) a control processor operably coupled to the transceivers configured to activate each transceiver, detect transmitted soundwaves, measure differential times of flight (TOF) of the soundwaves of each transceiver and to determine wind velocity along each sound path.

The apparatus of any preceding or following embodiment, wherein the transceivers of the apparatus transmit pulsed soundwaves with pulses between 2 pulses per second and 25 pulses per second.

The apparatus of any preceding or following embodiment, wherein multiple signal paths are measured simultaneously for each transmitted soundwave signal.

The apparatus of any preceding or following embodiment, further comprising: one or more transceiver support brackets, the brackets configured to orient transceivers mounted to the brackets at defined locations in relation to transceivers mounted to a second bracket.

The apparatus of any preceding or following embodiment, further comprising: at least one sensor selected from the group of sensors consisting of a temperature sensor, a magnetic compass and an accelerometer.

The apparatus of any preceding or following embodiment, the transceivers further comprising: a radio frequency transmitter for wireless control communications and data transfer between the transceiver and the control processor.

The apparatus of any preceding or following embodiment, further comprising: a central controller; and a radio frequency transmitter for wireless control communications and data transfer between the control processor and the central controller.

The apparatus of any preceding or following embodiment, wherein the central control further controls a building HVAC controller and a building environmental conditioning system.

The apparatus of any preceding or following embodiment, wherein the apparatus is configured as a duct flow anemometer; and wherein the duct flow anemometer is configured to measure volumetric air flow, temperature, and both velocity and temperature distribution, within a confined directional flow such as within a duct.

The apparatus of any preceding or following embodiment, wherein the transceivers measure averaged values of a one-directional flow within a duct cross-section that may be experiencing different velocities and temperatures at different points across the duct cross-section.

The apparatus of any preceding or following embodiment, wherein the sonic pathways between the transceivers are arranged along vertices forming a geometric shape of a square based pyramid.

The apparatus of any preceding or following embodiment, wherein the sonic pathways between the transceivers are arranged along vertices forming a geometric shape of a square based bi-pyramid.

The apparatus of any preceding or following embodiment, wherein the sonic pathways between the transceivers are arranged along four vertices forming a tetrahedron.

The apparatus of any preceding or following embodiment, the further comprising: a base; a plurality of transceiver support struts mounted vertically to the base; and transceiver orienting stubs coupled to the struts, each transceiver mounted to a stub; wherein each support stub fixes a direction of a transceiver.

The apparatus of any preceding or following embodiment, wherein the apparatus is configured as a room anemometer; wherein the room anemometer is configured to measure 3D air velocity vectors, air speed, and temperature within an open space such as a room; and wherein the sonic pathways are arranged along the four vertices of a tetrahedron.

The apparatus of any preceding or following embodiment, wherein the apparatus measures a 3-dimensional vector of wind speed and direction within the small volume of the tetrahedron.

The apparatus of any preceding or following embodiment, further comprising an onboard compass and accelerometer/inclinometer that allows the room anemometer to continuously correct for changes that may occur in its orientation, and to output a true earth-based azimuth and altitude for the wind velocity vector.

An air movement monitoring system, comprising: (a) one or more anemometers, each anemometer comprising: (i) a plurality of ultrasonic transceivers oriented towards each other in three-dimensional space, the transceivers configured to transmit and receive soundwaves along paths between transceivers; and (ii) a control processor operably coupled to the transceivers configured to activate each transceiver and detect transmitted soundwaves; and (b) a central controller in communication with each control processor of the anemometers configured to receive detected soundwave signal data and control the anemometers, the central controller having a processor and a non-transitory memory storing instructions executable by the processor, wherein the instructions, when executed by the processor, perform one or more steps comprising: (i) actuating the ultrasonic transceivers individually to transmit soundwaves; (ii) simultaneously receiving soundwave signals along multiple signal paths; (iii) measuring differential times of flight (TOF) of the soundwaves; and (iv) determining moving air velocity along each path.

The system of any preceding or following embodiment, the anemometers further comprising: a radio frequency transmitter for wireless control communications and data transfer between the transceiver control processer and the central controller.

The system of any preceding or following embodiment, the anemometers further comprising: one or more sensors selected from the group of sensors consisting of a temperature sensor, a magnetic compass and an accelerometer.

The system of any preceding or following embodiment, the anemometers further comprising: one or more transceiver support brackets, the brackets configured to orient transceivers mounted to the brackets at defined locations in relation to transceivers mounted to a second bracket.

The system of any preceding or following embodiment, the anemometers further comprising: at least one transceiver support structure with a base; a plurality of transceiver support struts mounted vertically to the base; and transceiver orienting stubs coupled to the struts, each transceiver mounted to a stub; wherein each support stub fixes a direction of a transceiver.

The system of any preceding or following embodiment, wherein the transceiver support struts and stubs minimize wake; and wherein any shielding effects of the structure can be corrected with redundant information.

The system of any preceding or following embodiment, wherein the sonic pathways between the transceivers are arranged along four vertices of a tetrahedron; wherein the apparatus measures a 3-dimensional vector of wind speed and direction within the small volume of the tetrahedron; and wherein the anemometer is configured to measure 3-dimensional air velocity vectors, air speed, and temperature within an open space such as a room.

The system of any preceding or following embodiment, wherein when executed by the processor, the instructions further perform one or more steps comprising: processing the soundwaves to measure air velocity and temperature in both homogeneous and inhomogeneous flow fields based on measuring phase angle of a few cycles within pulsed soundwave signals.

The system of any preceding or following embodiment, wherein when executed by the processor, the instructions further perform one or more steps comprising: processing the soundwaves to correct for wake effects by dropping wake-affected paths and using only unaffected paths.

The system of any preceding or following embodiment, wherein when executed by the processor, the instructions further perform one or more steps comprising: processing the soundwaves to correct for wake effects by applying individual adjustments to the wake-affected paths.

The system of any preceding or following embodiment, wherein when executed by the processor, the instructions further perform one or more steps comprising: measuring phase angles of each ultrasonic pulse; determining direction of phase rotation; filtering outliers by comparing an initial phase measurement with a successive phase measurement and dropping a measurement with a difference greater than 120°; and measuring air velocity and temperature from the filtered phase angles.

The system of any preceding or following embodiment, wherein when executed by the processor, the instructions further perform one or more steps comprising: measuring phase angles of each ultrasonic pulse; detecting cycles of the measured phase angles with measured wave magnitudes; selecting a phase angle within the measured magnitude; and calculating air velocity and temperature from the selected phase angles.

The system of any preceding or following embodiment, wherein when executed by the processor, the instructions further perform one or more steps comprising: measuring temperature and time of sonic pulses in still air to calculate a calibration phase angle; measuring temperature, time and a phase angle of each ultrasonic pulse; determining a difference between the measured phase angle and the calibration phase angle; and calculating air speed from the phase difference.

An anemometer apparatus, comprising: a plurality of transceivers configured to transmit and receive ultrasonic soundwaves; means for causing said transceivers to transmit soundwaves in both directions along paths between transceivers; means for measuring differential times of flight (TOF) of the soundwaves; means for using the TOF measurements to determine both velocity and temperature of air along each path; and means for measuring multiple signal paths simultaneously for each transmitted signal.

The apparatus of any preceding for following embodiment, wherein said apparatus is configured as a room anemometer; wherein said room anemometer is configured to measure 3D air velocity vectors, air speed, and temperature within an open space such as a room; and wherein the sonic pathways are arranged along the six vertices of a tetrahedron.

The apparatus of any preceding for following embodiment, wherein the apparatus measures a 3-dimensional vector of wind speed and direction within the small volume of the tetrahedron.

The apparatus of any preceding for following embodiment, wherein the tetrahedron uses the smallest number of transceivers possible for 3D flow measurement, while achieving redundant flow paths that enable precise elimination of wind disturbance effects caused by a structure or enclosure supporting the anemometer.

The apparatus of any preceding for following embodiment: wherein said apparatus is configured as a duct flow anemometer; and wherein said duct flow anemometer is configured to measure volumetric air flow, temperature, and both velocity and temperature distribution, within a confined directional flow such as within a duct.

The apparatus of any preceding for following embodiment, wherein the transceivers measure averaged values of a one-directional flow within a duct cross-section that may be experiencing different velocities and temperatures at different points across the duct cross-section.

The apparatus of any preceding or following embodiment, further comprising a signal processor for processing the soundwaves to measure air velocity and temperature in both homogeneous and inhomogeneous flow fields based on measuring phase angle of a few cycles within pulsed wave signals.

The apparatus of any preceding for following embodiment, further comprising a signal processor for processing the soundwaves to correct for wake effects by dropping wake-affected paths and using only unaffected paths.

The apparatus of preceding for following embodiment, further comprising a signal processor for processing the soundwaves to correct for wake effects by apply individual adjustments to the wake-affected paths The apparatus of any preceding or following embodiment, further comprising an onboard compass and accelerometer/inclinometer that allows the room anemometer to continuously correct for changes that may occur in its orientation, and to output the true earth-based azimuth and altitude for the wind velocity vector even if it is suspended rotating on a string.

The apparatus of any preceding or following embodiment, further comprising an apparatus for inserting and securing the duct flow anemometer into existing HVAC ducts.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula (e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to +10°, such as less than or equal to 5°, less than or equal to ±4°, less than or equal to ±3°, less than or equal to 2°, less than or equal to 1°, less than or equal to 0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Pseudocode for Chained Half-Cycle Algorithm algorithm Chained half-cycle-limit algorithm is
  input: phase at time t ($\varphi_t$)
  in memory: phase at time t−1 ($\varphi_{t-1}$), relative phase at time t−1 ($\Delta\varphi_{t-1}$)
  output: relative phase at time t ($\Delta\varphi_t$)
  $\Delta\varphi_0 \leftarrow 0$
  $d_t \leftarrow \varphi_t - \varphi_{t-1}$
  if abs(d) > 180 then
    $d_t \leftarrow -1 \times \text{sign}(d_t) \times (360 - \text{abs}(d_t))$
  if!is_noise($\varphi_t$) then
    $\Delta\varphi_t \leftarrow \Delta\varphi_{t-1} + d_t$
  Return $\Delta\varphi_t$
algorithm is_noise is
  input: $\varphi_t$, d, outlier_range (LR), jerk_limit (JL)
  in memory: $\varphi_{t-1}$, $\varphi_{t-2}$, $d_{t-1}$
  output: Boolean (T)
  T ← False
  if 180 − abs($d_t$) ≤ LR or abs($d_t - d_{t-1}$) ≥ JL then
    T ← True
  Return T

TABLE 2

Pseudocode for Magnitude-Guided Algorithm algorithm Magnitude guided algorithm is
  input: phase at time t ($\varphi_t$), magnitude at time t ($M_t$),
  wave magnitude (waveMag)
  in memory: phase at time 0 ($\varphi_0$), magnitude at time 0 ($M_0$)

TABLE 2-continued

Pseudocode for Magnitude-Guided Algorithm output: relative phase at time t ($\Delta\varphi_t$)
for each j ∈ [−3, −2, −1, 0, 1, 2, 3]

$$EM_{t,j} \longleftarrow M_0 + \left(j + \frac{\varphi_t - \varphi_0}{360}\right) \times waveMag$$

$j_{min} \longleftarrow$ index of $\min_j (EM_{t,j})$ $\Delta\varphi_t \longleftarrow \varphi_t - \varphi_0 + j_{min} \times 360$
Return $\Delta\varphi_t$

TABLE 3

Pseudocode for Temperature-Guided Algorithm algorithm Temperature guided algorithm is
  input: path 1 and 2 phase at time t ($\varphi_{t,a-b}$, $\varphi_{t,b-a}$), natural
  frequency ($f_n$)
  temperature at time t ($T_t$), distance between pair ($d_{a-b}$)
  in memory: path 1 and 2 phase at time 0 ($\varphi_{0,a-b}$, $\varphi_{0,a-b}$)
  temperature at time 0 ($T_0$)
  output: path 1 and 2 relative phase at time t ($\Delta\varphi_{t,a-b}$, $\Delta\varphi_{t,b-a}$)

$$dp_T \longleftarrow \left(\frac{d_{a-b}}{c(T_t)} - \frac{d_{a-b}}{c(T_0)}\right) \times \frac{360}{f_n}$$

$\varphi'_{0,a-b} \longleftarrow (\varphi_{0,a-b} + dp_{temp}) \% 360$
$\varphi'_{0,b-a} \longleftarrow (\varphi_{0,b-a} + dp_{temp}) \% 360$
$dp_{a-b} \longleftarrow \varphi_{t,a-b} - \varphi'_{0,a-b} + \text{int.div}(\varphi_{t,a-b} - \varphi'_{0,a-b}, 180) \times -360$
$dp_{b-a} \longleftarrow \varphi_{t,b-a} - \varphi'_{0,b-a} + \text{int.div}(\varphi_{t,b-a} - \varphi'_{0,b-a}, 180) \times -360$
$\Delta\varphi_{t,a-b} \longleftarrow dp_T + \text{sign}(dp_{a-b}) \times dp_{a-b}$
$\Delta\varphi_{t,b-a} \longleftarrow dp_T + \text{sign}(dp_{b-a}) \times dp_{b-a}$
Return $\Delta\varphi_{t,a-b}$ & $\Delta\varphi_{t,b-a}$

What is claimed is:

1. A duct flow anemometer apparatus, comprising:
 (a) a plurality of ultrasonic transceivers oriented towards each other in three-dimensional space, said transceivers configured to transmit and receive soundwaves along paths between transceivers; and
 (b) a control processor operably coupled to the transceivers configured to activate each transceiver, detect transmitted soundwaves, measure differential times of flight (TOF) of the soundwaves of each transceiver and to determine wind velocity along each sound path;
 (c) wherein said apparatus is configured to measure volumetric air flow, temperature, and both velocity and temperature distribution, within a confined directional flow within a duct; and
 (d) wherein the transceivers measure averaged values of a one-directional flow within a duct cross-section that may be experiencing different velocities and temperatures at different points across the duct cross-section.

2. The apparatus of claim 1, wherein the transceivers of the apparatus transmit pulsed soundwaves with pulses between 2 pulses per second and 25 pulses per second.

3. The apparatus of claim 1, wherein multiple signal paths are measured simultaneously for each transmitted soundwave signal.

4. The apparatus of claim 1, further comprising:
 one or more transceiver support brackets, said brackets configured to orient transceivers mounted to said brackets at defined locations in relation to transceivers mounted to a second bracket.

5. The apparatus of claim 1, further comprising:
 at least one sensor selected from the group of sensors consisting of a temperature sensor, a magnetic compass and an accelerometer.

6. The apparatus of claim 1, said transceivers further comprising:
 a radio frequency transmitter for wireless control communications and data transfer between the transceiver and the control processor.

7. The apparatus of claim 1, further comprising:
 a central controller; and
 a radio frequency transmitter for wireless control communications and data transfer between the control processor and the central controller.

8. The apparatus of claim 7, wherein said central control further controls a building HVAC controller and a building environmental conditioning system.

9. The apparatus of claim 1, wherein sonic pathways between said transceivers are arranged along vertices forming a geometric shape of a square based pyramid.

10. The apparatus of claim 1, wherein sonic pathways between said transceivers are arranged along vertices forming a geometric shape of a square based bi-pyramid.

11. The apparatus of claim 1, wherein sonic pathways between said transceivers are arranged along four vertices forming a tetrahedron.

12. A room anemometer apparatus, comprising:
 (a) a plurality of ultrasonic transceivers oriented towards each other in three-dimensional space, said transceivers configured to transmit and receive soundwaves along paths between transceivers;
 (b) a control processor operably coupled to the transceivers configured to activate each transceiver, detect transmitted soundwaves, measure differential times of flight (TOF) of the soundwaves of each transceiver and to determine wind velocity along each sound path;
 (c) an onboard compass and accelerometer/inclinometer that allows the room anemometer to continuously correct for changes that may occur in its orientation and to output a true earth-based azimuth and altitude for the wind velocity vector;
 (d) a base;
 (e) a plurality of transceiver support struts mounted vertically to the base; and
 (f) transceiver orienting stubs coupled to the struts, each transceiver mounted to a stub;
 (q) wherein each support stub fixes a direction of a transceiver);
 (h) wherein said room anemometer is configured to measure 3D air velocity vectors, air speed, and temperature within an open space; and
 (i) wherein sonic pathways are arranged along the four vertices of a tetrahedron; and
 (j) wherein the apparatus measures a 3-dimensional vector of wind speed and direction within the small volume of the tetrahedron.

13. An air movement monitoring system, comprising:
 (a) one or more anemometers, each anemometer comprising:
  (i) a plurality of ultrasonic transceivers oriented towards each other in three-dimensional space, said transceivers configured to transmit and receive soundwaves along paths between transceivers; and
  (ii) a control processor operably coupled to the transceivers configured to activate each transceiver and detect transmitted soundwaves; and
 (b) a central controller in communication with each control processor of said anemometers configured to receive detected soundwave signal data and control the anemometers, said central controller having a processor and a non-transitory memory storing instructions executable by the processor, wherein said instructions, when executed by the processor, perform one or more steps comprising:
(i) actuating said ultrasonic transceivers individually to transmit soundwaves;
(ii) simultaneously receiving soundwave signals along multiple signal paths;
(iii) measuring differential times of flight (TOF) of the soundwaves;
(iv) determining moving air velocity along each path; and
(v) processing the soundwaves to measure air velocity and temperature in both homogeneous and inhomogeneous flow fields based on measuring phase angle of a few cycles within pulsed soundwave signals.

14. The system of claim 13, said anemometers further comprising:
a radio frequency transmitter for wireless control communications and data transfer between the transceiver control processor and the central controller.

15. The system of claim 13, said anemometers further comprising:
one or more sensors selected from the group of sensors consisting of a temperature sensor, a magnetic compass and an accelerometer.

16. The system of claim 13, said anemometers further comprising:
one or more transceiver support brackets, said brackets configured to orient transceivers mounted to said brackets at defined locations in relation to transceivers mounted to a second bracket.

17. The system of claim 13, said anemometers further comprising:
at least one transceiver support structure with a base;
a plurality of transceiver support struts mounted vertically to the base; and
transceiver orienting stubs coupled to the struts, each transceiver mounted to a stub; wherein each support stub fixes a direction of a transceiver.

18. The system of claim 17:
wherein the transceiver support struts and stubs minimize wake; and
wherein any shielding effects of the structure can be corrected with redundant information.

19. The system of claim 17:
wherein the sonic pathways between the transceivers are arranged along four vertices of a tetrahedron;
wherein the apparatus measures a 3-dimensional vector of wind speed and direction within the small volume of the tetrahedron; and wherein said anemometer is configured to measure 3-dimensional air velocity vectors, air speed, and temperature within an open space.

20. The system of claim 13, wherein when executed by said processor, said instructions further perform one or more steps comprising:
processing the soundwaves to correct for wake effects by dropping wake-affected paths and using only unaffected paths.

21. The system of claim 13, wherein when executed by said processor, said instructions further perform one or more steps comprising:
processing the soundwaves to correct for wake effects by applying individual adjustments to the wake-affected paths.

22. The system of claim 13, wherein when executed by said processor, said instructions further perform one or more steps comprising:
measuring phase angles of each ultrasonic pulse;
determining direction of phase rotation;
filtering outliers by comparing an initial phase measurement with a successive phase measurement and dropping a measurement with a difference greater than 120°; and
measuring air velocity and temperature from the filtered phase angles.

23. The system of claim 13, wherein when executed by said processor, said instructions further perform one or more steps comprising:
measuring phase angles of each ultrasonic pulse;
detecting cycles of the measured phase angles with measured wave magnitudes;
selecting a phase angle within the measured magnitude; and
calculating air velocity and temperature from the selected phase angles.

24. The system of claim 13, wherein when executed by said processor, said instructions further perform one or more steps comprising:
measuring temperature and time of sonic pulses in still air to calculate a calibration phase angle;
measuring temperature, time and a phase angle of each ultrasonic pulse;
determining a difference between the measured phase angle and the calibration phase angle; and
calculating air speed from said phase difference.

* * * * *